US008143843B2

(12) United States Patent
Ichikawa

(10) Patent No.: US 8,143,843 B2
(45) Date of Patent: Mar. 27, 2012

(54) ELECTRICALLY-DRIVEN VEHICLE AND METHOD FOR CONTROLLING CHARGING OF ELECTRICALLY-DRIVEN VEHICLE

(75) Inventor: Shinji Ichikawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/061,831

(22) PCT Filed: Sep. 17, 2009

(86) PCT No.: PCT/JP2009/066221
§ 371 (c)(1),
(2), (4) Date: Mar. 2, 2011

(87) PCT Pub. No.: WO2010/035676
PCT Pub. Date: Apr. 1, 2010

(65) Prior Publication Data
US 2011/0169448 A1 Jul. 14, 2011

(30) Foreign Application Priority Data

Sep. 26, 2008 (JP) ................. 2008-247317

(51) Int. Cl.
*H01M 10/46* (2006.01)
(52) U.S. Cl. .................................... 320/104
(58) Field of Classification Search .............. 320/104, 320/107, 109, 114, 128, 134, 135, 136, 137
See application file for complete search history.

(56) References Cited

U.S. PATENT DOCUMENTS

| 5,931,245 | A | * | 8/1999 | Uetake et al. ............ 180/65.8 |
| 6,515,455 | B2 | * | 2/2003 | Hidaka ..................... 320/135 |
| 6,741,065 | B1 | | 5/2004 | Ishii et al. |
| 7,269,535 | B2 | | 9/2007 | Kishimoto |
| 2003/0062875 | A1 | * | 4/2003 | Nakamura et al. ............ 320/132 |
| 2008/0211302 | A1 | * | 9/2008 | Hirota et al. .................. 320/137 |
| 2009/0278492 | A1 | | 11/2009 | Shimizu et al. |

FOREIGN PATENT DOCUMENTS

JP  A-10-304582  11/1998
(Continued)

OTHER PUBLICATIONS

International Search Report issued in Application No. PCT/JP2009/066221; Dated Dec. 22, 2009 (With Translation).

*Primary Examiner* — Edward Tso
(74) *Attorney, Agent, or Firm* — Oliff & Berridge, PLC

(57) ABSTRACT

In an electrically-driven vehicle comprising a battery which can be charged from an external power supply, a charger, a charger controller which controls the charger, and a battery controller which monitors a battery state, energy loss during the charging is reduced and charging efficiency is improved. A hybrid electric vehicle which is the electrically-driven vehicle includes a charging circuit having a charger which is connected to a high-voltage battery and a charge-time connection switch which is connected between the high-voltage battery and the charger, a charger ECU, and a battery ECU. The battery ECU is activated when a voltage signal is input, and when determining that the state of the high-voltage battery satisfies a chargeable condition, connects the charge-time connection switch, activates the charger ECU and transmits a signal representing the battery state to the charger ECU.

12 Claims, 11 Drawing Sheets

FOREIGN PATENT DOCUMENTS

| | | |
|---|---|---|
| JP | A-11-1782258 | 7/1999 |
| JP | A-2000-197212 | 7/2000 |
| JP | A-2001-045673 | 2/2001 |
| JP | A-2003-088143 | 3/2003 |
| JP | A-2006-278210 | 10/2006 |
| JP | A-2006-304408 | 11/2006 |
| JP | A-2007-124813 | 5/2007 |
| JP | A-2007-336691 | 12/2007 |
| JP | A-2008-042985 | 2/2008 |
| WO | WO 2008/026390 A1 | 3/2008 |

* cited by examiner

ELECTRICALLY-DRIVEN VEHICLE AND METHOD FOR CONTROLLING CHARGING OF ELECTRICALLY-DRIVEN VEHICLE

TECHNICAL FIELD

The present invention relates to an electrically-driven vehicle having a battery which can be charged from an external power supply and a method of controlling charging of the electrically-driven vehicle.

RELATED ART

In the related art, in an electrically-driven vehicle equipped with a traveling motor such as an electric automobile or a hybrid electric vehicle, a configuration is conceived in which, when the driving of the vehicle is stopped, the battery is charged from an external power supply, which is a commercial power supply, through a connection section such as a power supply plug and a charging circuit having a charger. For example, in a hybrid electric vehicle which drives a wheel with at least one of an engine and the traveling motor as a drive source, such a vehicle in which the battery can be charged from the external power supply through the power supply plug is called a plug-in type hybrid electric vehicle.

In such an electrically-driven vehicle, in the related art, in order to enable charging of the battery from the external power supply through the power supply plug, a configuration is conceived in which a charger is connected between the power supply plug and the battery, and the battery can be charged from the external power supply through the charger.

Patent Document 1 discloses a charging system comprising a charging device equipped on an electric automobile and an electricity supply device on the side of the infrastructure. The charging device comprises a charge port unit (C/P unit) having a port. The electricity supply device comprises an AC power supply and a standard charge module (SCM) connected to the AC power supply. The SCM is connected to a paddle through a cable. In the C/P unit, a core and a charging coil are provided. The core of the C/P unit and the charging coil connected to an inverter of the SCM are provided at positions where the electricity supply coil in the paddle and the charging coil are proximate to each other when the paddle is at the charging position, and these are positions where an induced current is generated in the charging coil when a current flows through the electricity supply coil.

A limit switch which is closed when the paddle reaches the charging position is connected to an RF substrate which functions as a communication device, and when the limit switch is closed, a 12-V power supply is introduced to the RF substrate, and transmission and reception of a communication signal between the RF substrate and a communication device of the SCM is enabled. When a signal transmitted by the SCM is received by the RF substrate, a battery ECU activation signal is generated and transmitted to the battery ECU, and the battery ECU is activated. The battery ECU causes a current generated in the charging coil to be supplied to the battery, and charging of the battery is started. When power failure occurs, the battery ECU stops its function. When the power failure is resolved, the SCM starts transmission of the communication signal to the RE substrate, the battery ECU is activated, and the charging of the battery is restarted.

Patent Document 2 discloses a power supply device for an electric automobile, comprising a DC power supply device which supplies electricity from a commercial power supply to a main battery and which is fixed on the side of the ground or equipped in the electric automobile, and a battery ECU. The DC power supply device comprises a high-voltage output section which converts the power of the commercial power supply into a high-voltage DC power and supplies the converted power to the main battery, and a low-voltage output section which converts the power of the commercial power supply into a low-voltage DC power and supplies the converted power to an auxiliary battery.

In addition to Patent Document 1 and 2, related-art document related to the present invention include Patent Document 3-5.

[Related Art Documents]
[Patent Documents]
Patent Document 1: JP H10-304582 A
Patent Document 2: JP H11-178228 A
Patent Document 3: JP 2006-278210 A
Patent Document 4: JP 2006-304408 A
Patent Document 5: JP 2007-124813 A

DISCLOSURE OF INVENTION

[Technical Problem]

As described, in the electrically-driven vehicle considered in the related art, a configuration may be considered in which, in order to enable charging of the battery from the external power supply, a charger, a charger controller which controls the charger, and a battery controller which monitors a battery state are provided. In such a structure, when power is supplied from the external power supply to the charger, if the charger controller is activated regardless of the battery state, the charger controller may be unnecessarily activated, and the power may be wastefully consumed when the battery is charged from the external power supply. In other words, there is a possibility that even though the charge state, which is a battery state, is a fully charged state, the charger controller will be activated, resulting in waste of power. Because of this, it is desired to reduce energy loss during charging, and improve the charging efficiency in an electrically-driven vehicle comprising a battery which can be charged from an external power supply, a charger controller which controls a charger, and a battery controller which monitors a battery state.

Meanwhile, the configurations described in Patent Document 1-5 do not disclose a means which reduces the energy loss during charging and improves the charging efficiency in the electrically-driven vehicle comprising the battery which can be charged from the external power supply, the charger, the charger controller which controls the charger, and the battery controller which monitors the battery state.

An advantage of the present invention is that in an electrically-driven vehicle and a method of controlling charging of the electrically-driven vehicle, energy loss during charging is reduced, and charging efficiency is improved in an electrically-driven vehicle comprising a battery which can be charged from an external power supply, a charger, a charger controller which controls the charger, and a battery controller which monitors a battery state.

[Solution to Problem]

According to a first aspect of the present invention, there is provided an electrically-driven vehicle comprising a charging circuit having a battery which can be charged from an external power supply, which supplies power to a traveling motor during traveling of the vehicle, and which is disconnected from the traveling motor during charging from the external power supply, a charger which is connected to the battery by an electric power line and a switch which is connected between the charger and the battery by an electric power line, a charger controller which controls the charger, and a battery controller which monitors a battery state, wherein the battery controller is a battery controller which is activated when a voltage signal is input to the battery controller, and comprises a battery state judging unit which judges, after the battery controller is activated, whether or not the battery state satisfies a chargeable condition, and an activating unit which switches a switch which is connected to the battery controller by a signal line ON when the battery state judging unit judges that the battery state satisfies the chargeable condition, to activate the charger controller which is connected to the battery controller by a signal line, and the charger controller controls the charger such that the battery is charged from the external power supply.

According to a second aspect of the present invention, there is provided an electrically-driven vehicle comprising a charging circuit having a battery which can be charged from an external power supply, a charger which is connected to the battery by an electric power line, and a switch which is connected between the charger and the battery by an electric power line, a charger controller which controls the charger, a battery controller which monitors a battery state, a traveling motor which is driven by supply of power from the battery, a relay which is connected between the traveling motor and the battery by an electric power line, and a vehicle controller which switches the relay OFF when the battery is charged from the external power supply and which switches the relay ON when the traveling motor is driven, wherein the battery controller is a battery controller which is activated when a voltage signal is input to the battery controller, and comprises a battery state judging unit which judges, after the battery controller is activated, whether or not the battery state satisfies a chargeable condition, an activating unit which switches a switch which is connected to the battery controller by a signal line ON when the battery state judging unit judges that the battery state satisfies the chargeable condition, to activate the charger controller which is connected to the battery controller by a signal line, and a charge power determination signal transmitting unit which transmits, to the charger controller, a charge power determination signal representing the battery state or a calculated charge power to be charged to the battery which is calculated based on the battery state, and the charger controller controls the charger such that the battery is charged from the external power supply with a calculated charge power to be charged to the battery calculated based on the battery state represented by the charge power determination signal or the calculated charge power represented by the charge power determination signal.

The switch comprises, for example, a system relay.

Preferably, in the electrically-driven vehicle of these aspects of the present invention, a plurality of batteries are employed as the battery, a plurality of battery controllers each corresponding to each battery and communicating with the charger controller are employed as the battery controller, a plurality of switches each connected between each battery and the charger by an electric power line are employed as the switch, and the charger controller controls the charger such that each battery is charged from the external power supply with a calculated charge power of the battery calculated based on the battery state transmitted from each battery controller or the calculated charge power transmitted from the battery controller.

Preferably, in the electrically-driven vehicle of these aspects of the present invention, each of the plurality of battery controllers judges whether or not the battery state of a corresponding battery satisfies the chargeable condition, and at least one battery controller transmits an activation instruction signal to the charger controller after only a switch, among the plurality of switches, corresponding to a battery judged as satisfying the chargeable condition is switched ON.

Preferably, in the electrically-driven vehicle of these aspects of the present invention, during charging of the battery from the external power supply, the battery controller which monitors the battery state and the charger controller which controls the charger are activated, and controllers other than the battery controller and the charger controller are not activated.

Preferably, the electrically-driven vehicle of these aspects of the present invention further comprises a travel-time connection switch which is connected, by an electric power line, between an inverter or a voltage boosting converter which is driven during traveling and the battery, wherein a current capacity of a charge-time connection switch which is a switch connected between the battery and the charger by an electric power line is set to be lower than a current capacity of the travel-time connection switch. The travel-time connection switch includes, for example, a system relay.

Preferably, in the electrically-driven vehicle of these aspects of the present invention, in the configuration comprising the travel-time connection switch which is connected, by the electric power line, between the inverter or the voltage boosting converter which is driven during traveling and the battery, and wherein the current capacity of the charge-time connection switch which is connected between the battery and the charger by the electric power line is set to be lower than the current capacity of the travel-time connection switch, the charge-time connection switch comprises a MOS-FET having a current cut-off function and a system relay connected in series to the MOS-FET.

Preferably, in the electrically-driven vehicle of these aspects of the present invention, in the configuration comprising the travel-time connection switch which is connected, by the electric power line, between the inverter or the voltage boosting converter which is driven during traveling and the battery, and wherein the current capacity of the charge-time connection switch, which is the switch connected between the battery and the charger by the electric power line, is set to be lower than the current capacity of the travel-time connection switch, a travel-time connection switch controller is provided which switches the travel-time connection ON when a signal representing that an activation switch which can be operated by a driver is switched ON is input during charging from the external power supply, and which does not switch the travel-time connection switch ON when the signal representing that the activation switch is switched ON during the charging from the external power supply is not input.

Preferably, in the electrically-driven vehicle of these aspects of the present invention, in the configuration comprising the travel-time connection switch which is connected, by the electric power line, between the inverter or the voltage boosting converter which is driven during traveling and the battery, and wherein the current capacity of the charge-time connection switch, which is the switch connected between the battery and the charger by the electric power line, is set to be lower than the current capacity of the travel-time connection switch, a fusing detecting unit is provided which detects presence/absence of fusing of the system relay of the charge-time connection switch when the charger is activated.

Preferably, the electrically-driven vehicle of these aspects of the present invention further comprises two power converters for charging a low-voltage battery, one of the two power converters being equipped in the charger and being activated only during charging from the external power supply and the other one of the two power converters being activated only during traveling of the vehicle, wherein an output capacity of the one power converter is set to be lower than an output capacity of the other power converter, and a power converter controlling unit is provided which drives the other power converter when a signal representing that an activation switch which can be operated by a driver is switched ON is input during charging from the external power supply and stops driving of the one power converter. The power converter is a DC/DC converter or an AC/DC converter.

According to a third aspect of the present invention, there is provided a method of controlling charging of an electrically-driven vehicle comprising a charging circuit having a battery which can be charged from an external power supply, which supplies power to a traveling motor during traveling of the vehicle, and which is disconnected from the traveling motor during charging from the external power supply, a charger which is connected to the battery by an electric power line, and a switch which is connected between the charger and the battery by an electric power line, a charger controller which controls the charger, and a battery controller which monitors a battery state, the method comprising the steps of activating the battery controller when a voltage signal is input to the battery controller, judging, by the battery controller, after the the battery controller has been activated, whether or not the battery state satisfies a chargeable condition, switching a switch which is connected to the battery controller by a signal line ON when the battery controller judges that the battery state satisfies the chargeable condition, to activate the charger controller which is connected to the battery controller by a signal line, and controlling, by the charger controller, the charger such that the battery is charged from the external power supply.

According to a fourth aspect of the present invention, there is provided a method of controlling charging of an electrically-driven vehicle comprising a charging circuit having a battery which can be charged from an external power supply, a charger which is connected to the battery by an electric power line, and a switch which is connected between the charger and the battery by an electric power line, a charger controller which controls the charger, a battery controller which monitors a battery state, a relay which is connected between the traveling motor and the battery by an electric power line, and a vehicle controller which switches the relay OFF when the battery is charged from the external power supply and which switches the relay ON when the traveling motor is driven, the method comprising the steps of activating the battery controller when a voltage signal is input to the battery controller, judging, by the battery controller, after the battery controller has been activated, whether or not the battery state satisfies a chargeable condition, switching a switch which is connected to the battery controller by a signal line ON when the battery controller judges that the battery state satisfies the chargeable condition, to activate the charger controller which is connected to the battery controller by a signal line, transmitting, by the battery controller, to the charger controller, a charge power determination signal representing the battery state or a calculated charge power to be charged to the battery which is calculated based on the battery state, and controlling, by the charger controller, the charger such that the battery is charged from the external power supply with a calculated charge power to be charged to the battery calculated based on the battery state represented by the charge power determination signal or the calculated charge power represented by the charge power determination signal.

Preferably, in the method of controlling charging of the electrically-driven vehicle of these aspects of the present invention, a plurality of batteries are employed as the battery, a plurality of battery controllers each corresponding to each battery and communicating with the charger controller are employed as the battery controller, a plurality of switches each connected between each battery and the charger by an electric power line are employed as the switch, and the method further comprises the step of controlling, by the charger controller, the charger such that each battery is charged from the external power supply with a calculated charge power of the battery calculated based on the battery state transmitted from each battery controller or the calculated charge power transmitted from the battery controller.

Preferably, the method of controlling charging of the electrically-driven vehicle of these aspects of the present invention further comprises the step of judging, by each of the plurality of battery controllers, whether or not the battery state of a corresponding battery satisfies the chargeable condition, and transmitting, by at least one battery controller, an activation instruction signal to the charger controller after only a switch, among the plurality of switches, corresponding to a battery judged as satisfying the chargeable condition is switched ON.

[Advantageous Effects of Invention]

According to the electrically-driven vehicle of the second aspect of the present invention and the method of controlling charging of the electrically-driven vehicle of the fourth aspect of the present invention, in an electrically-driven vehicle having a battery which can be charged from an external power supply, a charger, a charger controller which controls the charger, and a battery controller which monitors a battery state, the energy loss during charging can be reduced and the charging efficiency can be improved. In other words, according to the electrically-driven vehicle of the present invention, during charging, the battery controller is activated when a voltage signal is input to the battery controller, a switch is switched ON by the activating unit and the charger controller is activated when the battery state judging unit judges that the battery state satisfies the chargeable condition, and the charger controller controls the charger such that the battery is charged from the external power supply with a calculated charge power which is calculated based on the battery state which is transmitted from the charge power determination signal transmitting unit or a calculated charge power which is transmitted from the charge power determination signal transmitting unit. Because of this, unnecessary activation of the charger controller during charging from the external power supply can be prevented, the energy loss during charging can be reduced, and the charging efficiency can be improved.

Moreover, according to the electrically-driven vehicle of the second aspect of the present invention and the method of controlling charging of the electrically-driven vehicle of the fourth aspect of the present invention, because the electrically-driven vehicle has a relay which is connected between the traveling motor and the battery by an electric power line and a vehicle controller which switches the relay OFF when the battery is charged from the external power supply and which switches the relay ON when the traveling motor is driven, the charging from the external power supply can be efficiently executed. Specifically, during charging from the external power supply, the battery controller is activated when a voltage signal is input to the battery controller, and the charger controller is activated when the battery state judging unit judges that the battery state satisfies the chargeable condition, but the relay which is connected between the traveling motor and the battery is switched OFF. Thus, activation of a system for driving the traveling motor, which is connected to the side nearer to the traveling motor than the relay and which drives the inverter or the like can be prevented. Because of this, power consumption during charging can be reduced, and the charging efficiency can be improved. On the other hand, during the traveling, the relay which is connected between the traveling motor and the battery is switched ON, and thus the power from the battery can be supplied to the side of the traveling motor and the traveling using the traveling motor can be executed in the vehicle.

Furthermore, according to the configuration in which a plurality of batteries are employed as the battery, a plurality of battery controllers each corresponding to each battery and communicating with the charger controller are employed as the battery controller, a plurality of switches each connected between each battery and the charger by an electric power line are employed as the switch, and the charger controller controls the charger such that each battery is charged from the external power supply with a calculated charge power of the battery which is calculated based on the battery state which is transmitted from each battery controller or the calculated charge power which is transmitted from the battery controller, efficient charging from the external power supply can be enabled in a structure which can use a plurality of batteries simultaneously and efficiently during traveling of the vehicle.

In addition, according to the configuration of the electrically-driven vehicle of various aspects of the present invention comprising the travel-time connection switch which is connected between the inverter or the voltage boosting converter which is driven during traveling and the battery, and wherein the current capacity of a charge-time connection switch, which is a switch connected between the battery and the charger by an electric power line, is set to be lower than the current capacity of the travel-time connection switch, and the charge-time connection switch comprises a MOS-FET having a current cut-off function and a system relay connected in series to the MOS-FET, it is not necessary to provide the current cut-off function in the system relay, and thus the charging efficiency can be improved by the reduction in size and reduction in loss of the system relay.

Moreover, according to the configuration of the electrically-driven vehicle of the present invention comprising the travel-time connection switch which is connected between an inverter or a DC/DC converter which is driven during traveling and the battery, and wherein a current capacity of a charge-time connection switch, which is a switch connected between the battery and the charger by an electric power line, is set to be lower than a current capacity of the travel-time connection switch, and a travel-time connection switch controller is provided which switches the travel-time connection switch ON when a signal representing that an activation switch which can be operated by a driver is switched ON is input during charging from the external power supply and which does not switch the travel-time connection switch ON when the signal representing that the activation switch is switched ON is not input during charging from the external power supply, application of a high voltage to the devices equipped on the vehicle and which are driven during traveling such as electrically-driven power steering device can be prevented.

DESCRIPTION OF EXEMPLARY EMBODIMENTS

First Embodiment of the Present Invention

Figure 1:
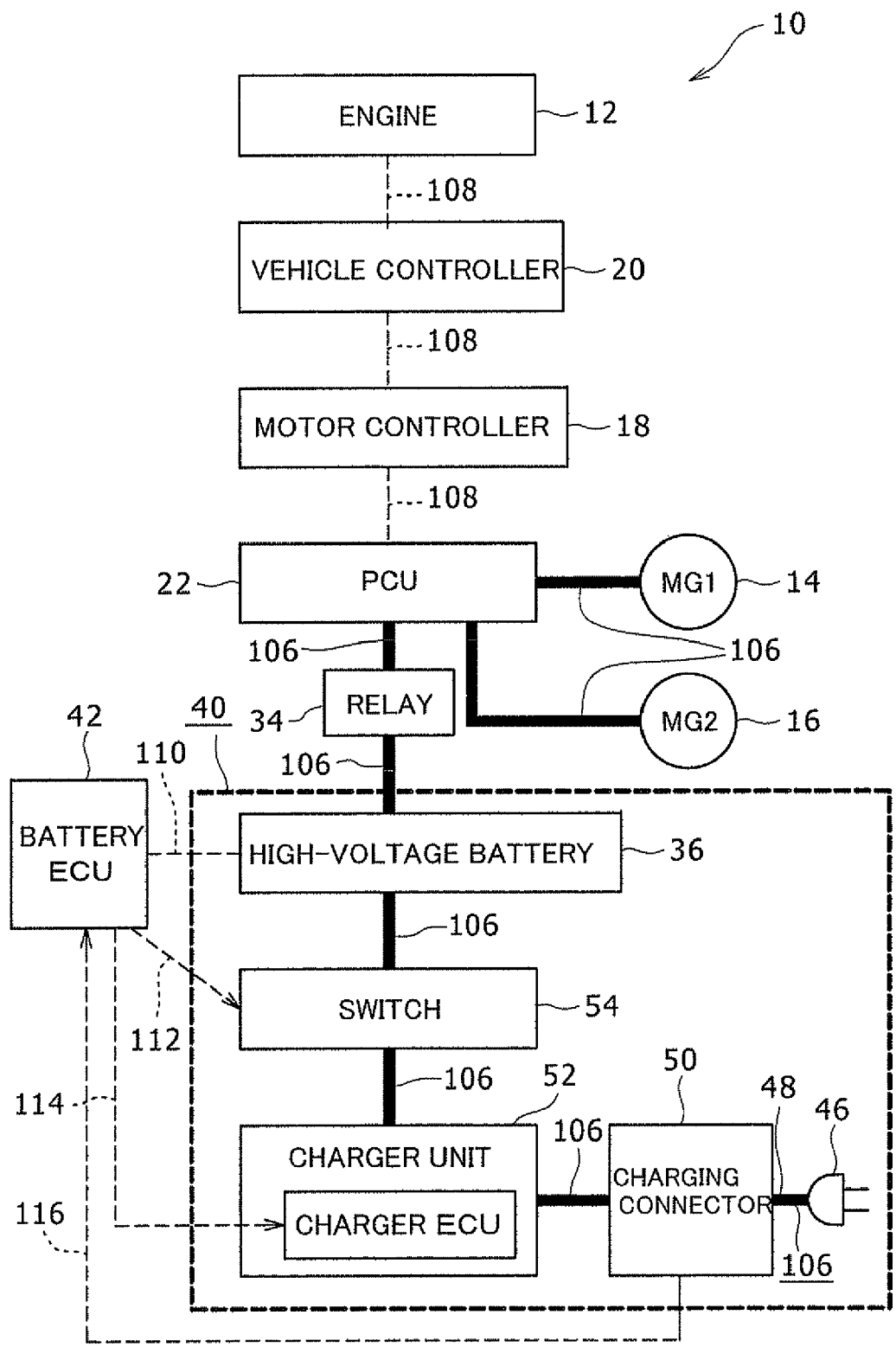
FIG. 1 is a block diagram showing a structure of a hybrid electric vehicle according to a first embodiment of the present invention.
Figure 2:
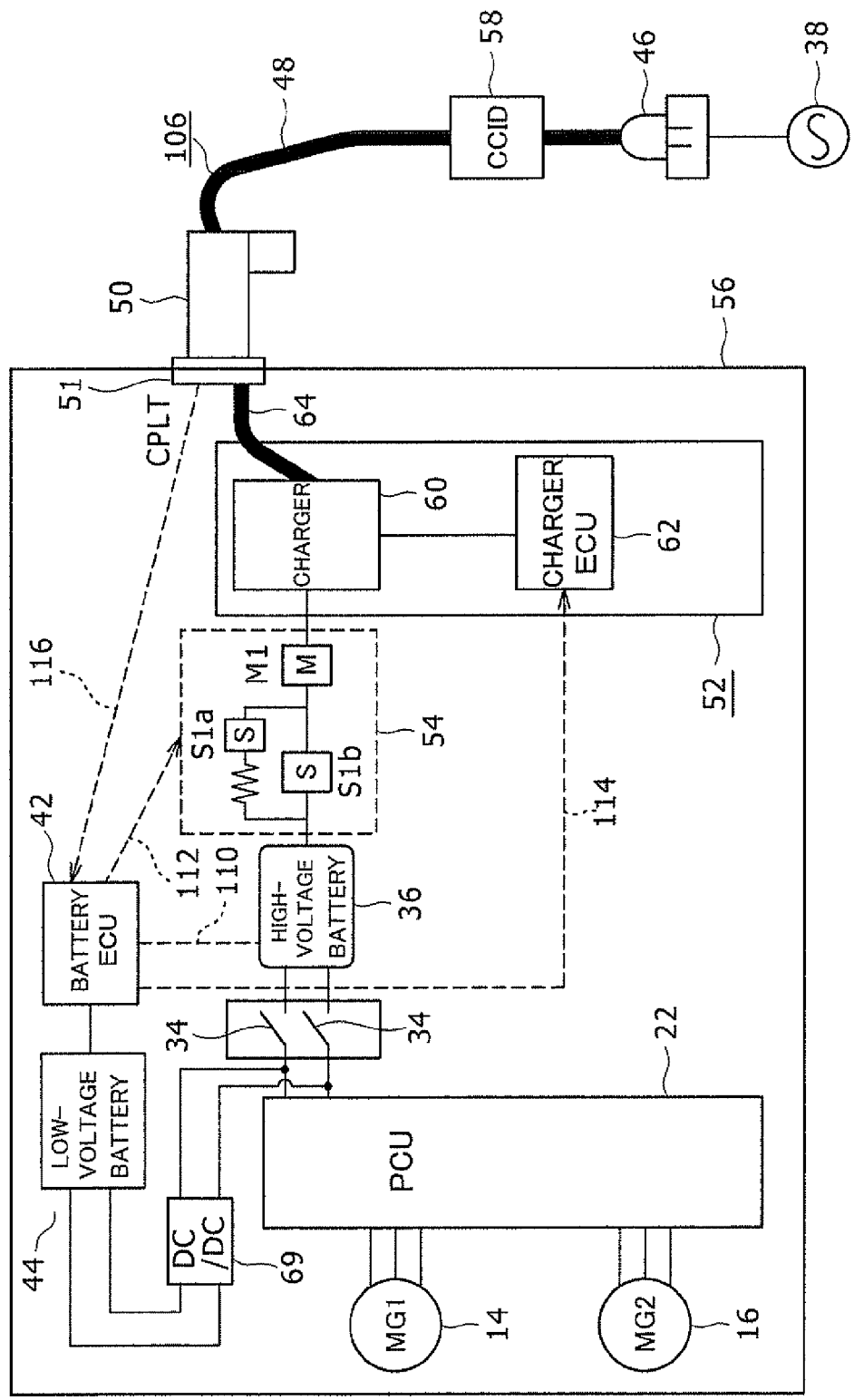
FIG. 2 is a diagram showing a circuit of a structure of a part of FIG. 1.
Figure 3:
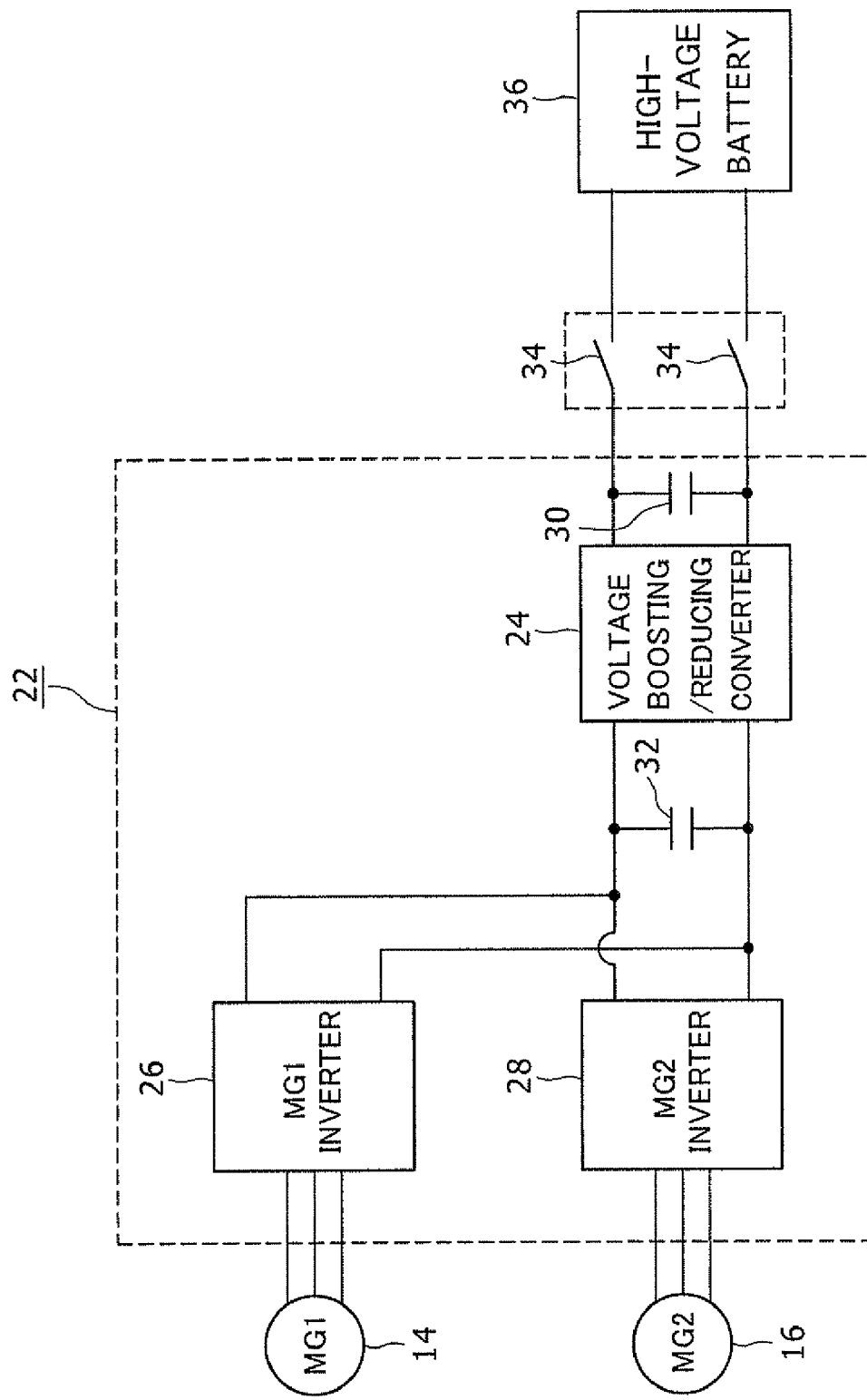
FIG. 3 is a diagram showing a circuit including a power control unit of FIG. 2.
Figure 4:
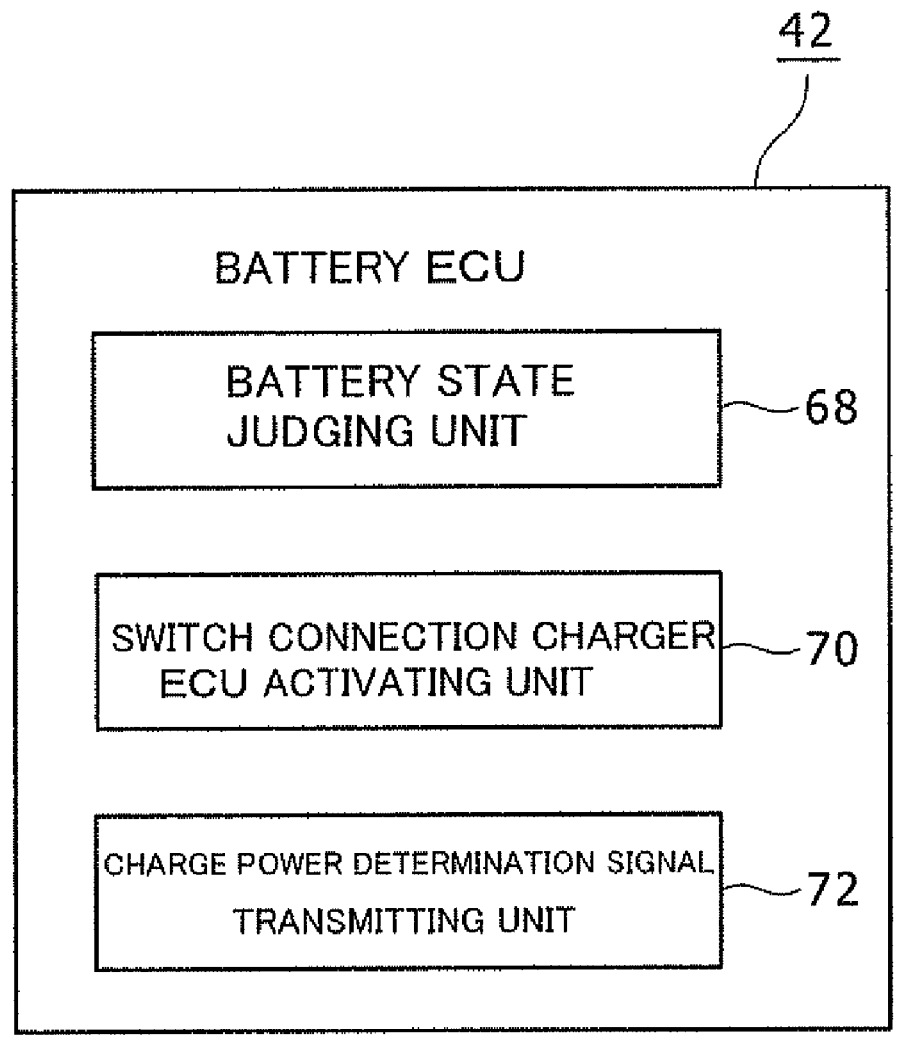
FIG. 4 is a block diagram showing a structure of a battery ECU of FIG. 2 in detail.
Figure 5:
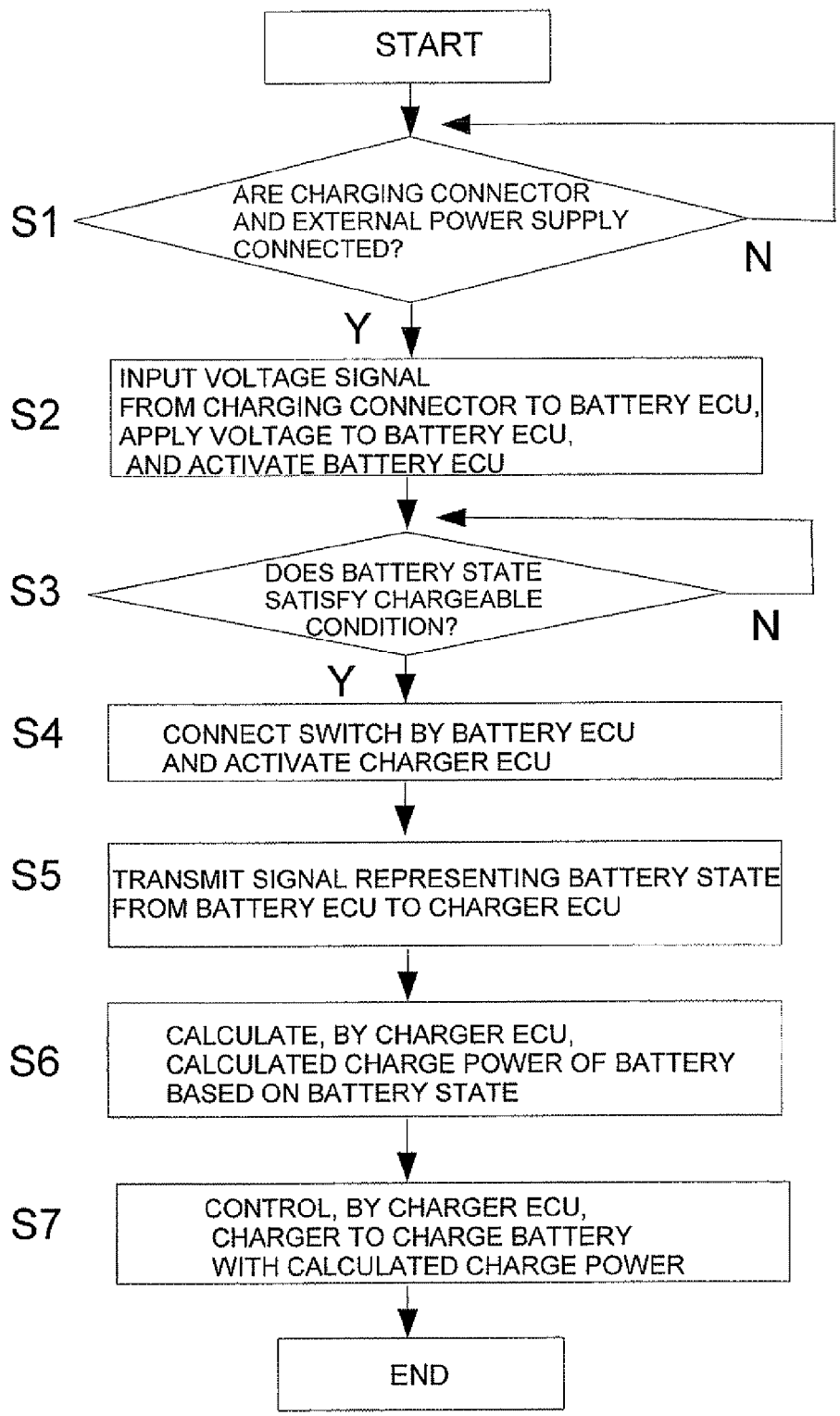
FIG. 5 is a flowchart for explaining a method of controlling charging of a hybrid electric vehicle according to a first embodiment of the present invention.

Embodiments of the present invention will now be described in detail with reference to the drawings. FIGS. 1-4 show a first embodiment of the present invention. FIG. 1 is a block diagram showing a structure of a hybrid electric vehicle according to the present embodiment. FIG. 2 is a diagram showing a circuit of a structure of a part of FIG. 1. FIG. 3 is a diagram showing a circuit including a power control unit of FIG. 2. FIG. 4 is a block diagram showing a structure of a battery ECU of FIG. 2 in detail. FIG. 5 is a flowchart for explaining a method of controlling charging of a hybrid electric vehicle of the present embodiment.

In the present embodiment, an example configuration is described in which the electrically-driven vehicle of the present invention is applied to a hybrid electric vehicle which is an electrically-driven vehicle which travels with at least one of an engine and a traveling motor as a motive force source for traveling. However, the present invention is not limited to such a configuration, and may be applied to a case where the electrically-driven vehicle is an electric automobile which travels with only the traveling motor as the motive force source for traveling.

As shown in FIG. 1, a hybrid electric vehicle 10 which is an electrically-driven vehicle of the present embodiment comprises an engine 12, a generator (MG1) 14 which is a first motor generator, and a traveling motor (MG2) 16 which is a second motor generator. Driving of the generator 14 and the traveling motor 16 are controlled by a motor controller 18.

The hybrid electric vehicle 10 further comprises a vehicle controller 20 which outputs a control signal to the engine 12 based on a signal which is input from an acceleration opening sensor (not shown), a shift lever position sensor (not shown), a vehicle velocity sensor (not shown), etc., and which also outputs, to the motor controller 18, a signal corresponding to a torque instruction value to be output to the generator 14 and the traveling motor 16. At least one of the engine 12 and the traveling motor 16 is used as a traveling motive force source, to drive a wheel (not shown). The generator 14 is a 3-phase AC motor, and may also be used as a startup motor for the engine 12. The traveling motor 16 is a 3-phase AC motor and may also be used as a generator, that is, for regenerative power. In the present specification and the claims, the "traveling motor" and the "generator" are distinctively described for the purpose of convenience, but in the present embodiment, these elements are both motor generators having both functions. Alternatively, in the present invention, an element only having the function of the motor may be used as the "traveling motor".

Drive states of the generator 14 and the traveling motor 16 are controlled by the motor controller 18 through a power control unit (PCU) 22. As shown in FIG. 3, the power control unit 22 comprises a voltage boosting/reducing converter 24. Specifically, the power control unit 22 comprises a generator inverter (MG1 inverter) 26, a traveling motor inverter (MG2 inverter) 28, a voltage boosting/reducing converter 24, a first capacitor 30, and a second capacitor 32. In addition, a relay 34 which is a travel-time connection switch and which is controlled to be opened or closed by the vehicle controller 20 or the motor controller 18 is connected to each of a positive electrode side line and a negative electrode side line connecting between a high-voltage battery 36 and terminals of the first capacitor. The motor controller 18 (FIG. 1) outputs drive control signals for the generator 14 and the traveling motor 16 to the inverters 26 and 28, and each of the inverters 26 and 28 drives each of the generator 14 and the traveling motor 16 based on the drive control signal.

The voltage boosting/reducing converter 24 can boost a DC voltage which is supplied from the high-voltage battery 36 equipped on the hybrid electric vehicle 10 (FIG. 1) through the first capacitor 30 and can supply the boosted voltage to the second capacitor 32. The relay 34 is switched ON or OFF by a signal from the motor controller 18 or the vehicle controller 20 (FIG. 1).

The voltage boosting/reducing converter 24 also has a function to boost a DC voltage in response to a signal from the motor controller 18 (FIG. 1) and according to an ON time and an OFF time of a switching element such as a transistor (not shown), and to supply the boosted voltage to the second capacitor 32. The second capacitor 32 smoothens the DC voltage received from the voltage boosting/reducing converter 24, and supplies the smoothened DC voltage to the generator inverter 26 and the traveling motor inverter 28.

When the generator inverter 26 is supplied with the DC voltage from the second capacitor 32, the generator inverter 26 converts the DC voltage into an AC voltage based on a signal corresponding to the torque instruction value from the motor controller 18 (FIG. 1), and drives the generator 14. When the traveling motor inverter 28 is supplied with the DC voltage from the second capacitor 32, the traveling motor inverter 28 converts the DC voltage into an AC voltage based on a signal corresponding to the torque instruction value from the motor controller 18, and drives the traveling motor 16.

The generator inverter 26 also converts an AC voltage generated by the generator 14 into a DC voltage based on a signal from the motor controller 18 and supplies the converted DC voltage through the second capacitor 32 to the voltage boosting/reducing converter 24. Similarly, the traveling motor inverter 28 converts an AC voltage generated by the traveling motor 16 during regenerative braking of the hybrid electric vehicle 10 (FIG. 1) into a DC voltage based on a signal from the motor controller 18, and supplies the converted DC voltage through the second capacitor 32 to the voltage boosting/reducing converter 24. The DC voltage supplied to the voltage boosting/reducing converter 24 in this manner is supplied through the first capacitor 30 to the high-voltage battery 36, and the high-voltage battery 36 is charged. As shown in FIG. 1, the engine 12, the vehicle controller 20, the motor controller 18, and the power control unit 22 are connected by signal lines 108.

As shown in FIGS. 1 and 2, the high-voltage battery 36 is configured to be chargeable from an external power supply 38 (FIG. 2) which is a commercial power supply and an AC power supply. In other words, the high-voltage battery 36 can supply power to the traveling motor 16 and can also be charged from the external power supply 38. A voltage of the high-voltage battery 36 is, for example, 200 V or the like.

In addition, as shown in FIG. 1, the hybrid electric vehicle 10 of the present embodiment further comprises a charging circuit 40, a battery ECU 42 which is a battery controller which monitors a state of the high-voltage battery 36, and an auxiliary low-voltage battery 44 (FIG. 2). The charging circuit 40 comprises a plug 46 which can be connected to the external power supply 38 (FIG. 2), a high-voltage-related cable 48 to which the plug 46 is connected, a charging connector 50 connected to the high-voltage-related cable 48, a charge inlet 51 (FIG. 2) which is a charging port which can be connected to the charging connector 50, a charger unit 52 to be connected to the charge inlet 51, and a charge-time connection switch 54 connected between the high-voltage battery 36 and the charger unit 52. As shown in FIG. 1, electrical power lines 106 which are also called power lines connect between the power control unit 22 and the generator 14 and traveling motor 16, between the power control unit 22, the relay 34, the high-voltage battery 36, the charge-time connection switch 54, and the charger unit 52, between the charger unit 52 and the charge inlet 51, and between the charging connector 50 and the plug 46. The high-voltage-related cable 48 constitutes the electrical power line 106.

As shown in FIG. 2, when the charging connector 50 is connected to the charge inlet 51 provided on a vehicle body 56, the charging connector 50 is connected to the external power supply 38 through the high-voltage-related cable 48 and the plug 46 extending from the vehicle body 56 to the outside. The charge inlet 51 is a power interface for receiving the charge power from the external power supply 38 outside of the vehicle. When the charging connector 50 is connected to the external power supply 38, a CPLT which is a voltage signal is output to the battery ECU 42. The CPLT is a voltage signal which is generated by a CPLT generator, for example, a control pilot circuit (not shown), of a CCID (Charging Circuit Interrupt Device) 58, and is output through the charging connector 50 to the battery ECU 42 and input to an I/O of the battery ECU 42, so that a voltage is applied to the I/O of the battery ECU 42 and the battery ECU 42 including a switch connection charger ECU activating unit 70 (FIG. 4) is activated. The CCID 58 also has an electricity leakage detecting unit. Alternatively, a configuration may be employed in which the CCID 58 does not generate the CPLT and the charging connector 50 generates the CPLT. For this purpose, the CCID 58 or the charging connector 50 comprises a CPLT generator, which has a function to be operated by supply of power from the external power supply 38 when the external power supply 38 and the plug 46 are connected and to generate the CPLT. Alternatively, the CPLT generator may be configured to cause, when the charging connector 50 is connected to the charge inlet 51, the CPLT to oscillate at a duty cycle (ratio of ON duty width with respect to oscillation period) which is set based on a rated current determined for each charging cable and to notify the rated current to the battery ECU 42. The CCID 58 and the charging connector 50 are connected to each other by a signal line (not shown), and the CPLT which is transmitted from the CCID 58 is output through the charging connector 50 and the charge inlet 51 to the battery ECU 42. As another embodiment different from the present embodiment, it is also possible to employ a configuration similar to the present embodiment in an electrically-driven vehicle in which the CCID 58 is built into the vehicle, it is made possible to draw out and retract the high-voltage-related cable 48 to which the plug 46 is connected with respect to the vehicle, and the CPLT is output from the CCID 58 to the battery ECU 42. In this case, the charging connector 50 and the charge inlet 51 may be omitted and the CCID 58 may be connected to the charger unit 52 through the electric power line. For example, in an electrically-driven vehicle, a housing unit which enables winding or retraction of the high-voltage-related cable 48 may be provided on the vehicle body. During charging, the high-voltage-related cable 48 is drawn out from the vehicle body to the outside and the plug 46 is connected to the external power supply 38.

In the present embodiment, the charger unit 52 comprises a charger 60 and a charger ECU 62 which is a charger controller which controls the charger 60, and the charging connector 50 and the charger 60 are connected to each other by a high-voltage-related cable 64 constituting the electrical power line 106. The charger 60 comprises an AC/DC converter (not shown) which converts the AC current which is input from the charging connector 50 into a DC current.

The charge-time connection switch 54 comprises two system relays S1$a$ and S1$b$ which are connected in parallel to each other, and a semiconductor switching element M1 which is connected in series to each of the system relays S1$a$ and S1$b$ and having a current cut-off function. A resistor is connected in series to one system relay S1$a$ of the two system relays S1$a$ and S1$b$. For example, only one of the two system relays S1$a$ and S1$b$ is connected and the other is disconnected. The semiconductor switching element M1 is, for example, a MOS-FET, and is used for cutting off the current, and the system relays S1$a$ and S1$b$ are used to physically disconnect the circuits. The charge-time connection switch 54 connects one system relay S1$a$ (or S1$b$) of the two system relays S1$a$ and S1$b$ and the semiconductor switching element M1 when a connection instruction signal is input from the battery ECU 42.

The battery ECU 42 is connected to the charging connector 50, the charge-time connection switch 54, the high-voltage battery 36, and the charger ECU 62 by signal lines 116, 112, 110, and 114, respectively, which are low-voltage-related cables. After activation, the battery ECU 42 receives an input of a detection signal representing a temperature, a current value, a voltage value, or the like of the high-voltage battery 36 from a sensor provided on the side of the high-voltage battery 36, and estimates and monitors an SOC (State Of Charge) which represents a state of the battery and an amount of charge in the high-voltage battery 36, based on the input detection signal. The SOC represents a ratio of the present current amount of charge with respect to the full amount of charge in the high-voltage battery 36, and, for example, defines the amount in units of percent (%). The battery ECU 42 outputs a connection instruction signal to the charge-time connection switch 54 when the battery ECU 42 judges that the state of the high-voltage battery 36, for example, the SOC, the temperature of the high-voltage battery 36, presence/absence of electricity leakage of the high-voltage battery 36, or the like, satisfies a chargeable condition which is set in advance. With this process, the charge-time connection switch 54 is connected, the charger ECU 62 is activated, and the battery ECU 42 transmits a signal representing the battery state to the charger ECU 62. In other words, as shown in FIG. 4, the battery ECU 42 comprises a battery state judging unit 68, a switch connection charger ECU activating unit 70, and a charge power determination signal transmitting unit 72.

As shown in FIG. 2, the battery ECU 42 is activated when the CPLT is input from the charging connector 50 through the charge inlet 51 to the battery ECU 42 and a voltage is applied to the battery ECU 42, therefore, the battery ECU 42 is activated, and, after the battery ECU 42 is activated, the battery ECU 42 receives supply of power from the low-voltage battery 44 in place of the charging connector 50. More specifically, the battery ECU 42 which is also activated during the traveling of the vehicle is activated with the CPLT as a trigger, the CPLT being transmitted by the charging connector 50 when the plug 46 is connected to the external power supply 38 and the charging connector 50 is inserted into the charge inlet 51, that is, when the charging connector 50 is connected to the charge inlet 51. The voltage of the low-voltage battery 44 is, for example, 12 V or the like, and is lower than the voltage of the high-voltage battery 36. A positive electrode side line and a negative electrode side line of the low-voltage battery 44 are connected between the power control unit 22 and the high-voltage battery 36 through a DC/DC converter 69. A power capacity of the DC/DC converter 69 is set to be lower than a power capacity of the voltage boosting/reducing converter 24 (FIG. 3). In other words, for the switching element such as the transistor or the like constituting a part of the voltage boosting/reducing converter 24, switching elements are used having a capability that can endure usage in a case where a number of devices to be simultaneously connected to the voltage boosting/reducing converter 24 and which supply the power is greater than the case of the DC/DC converter 69. The DC/DC converter 69 shown in FIG. 2 can convert the DC voltage supplied from the high-voltage battery 36 such as 200 V or the like into a DC voltage of 12 V or the like and can supply the converted voltage to the low-voltage battery 44. Meanwhile, the voltage boosting/reducing converter 24 shown in FIG. 3 can convert the DC voltage supplied from the high-voltage battery 36 such as 200 V or the like into a DC voltage of a higher voltage great range such as, for example, 200 V to 650 V, and can supply the converted voltage to a load such as the traveling motor 16.

The battery state judging unit 68 (FIG. 4) monitors, after the battery ECU 42 is activated, the state of the high-voltage battery 36, and judges whether or not the state of the high-voltage battery 36 satisfies all of chargeable conditions which are set in advance. For example, the chargeable conditions may be that there is no electricity leakage of the high-voltage battery 36, that the temperature of the high-voltage battery 36 is within a standard range, that the SOC of the high-voltage battery 36 is within a standard range, that the high-voltage battery 36 is normally functioning, etc.

When the battery state judging unit 68 (FIG. 4) judges that the battery state satisfies all of the chargeable conditions, the switch connection charger ECU activating unit 70 (FIG. 4) outputs the connection instruction signal to the charge-time connection switch 54 to connect the charge-time connection switch 54 and activate the charger ECU 62. The charger ECU 62 is a high-voltage-related ECU which is driven by a voltage from the high-voltage battery 36.

The charge power determination signal transmitting unit 72 (FIG. 4) transmits to the charger ECU 62 a charge power determination signal representing an estimated value of the SOC of the high-voltage battery 36 which is the battery state. The battery ECU 42 is an ECU (Electric Control Unit) which is activated during traveling of the vehicle, and has the information of the high-voltage battery 36 during the traveling, that is, the state of the high-voltage battery 36 during the traveling is stored in a storage unit. On the other hand, the charger ECU 62 is not activated during the traveling of the vehicle. In other words, at the time of charging of the high-voltage battery 36 from the external power supply 38, the battery ECU 42 and the charger ECU are activated on the side of the vehicle, and a ECU(s) which is the controller other than the battery ECU 42 and the charger ECU 62 on the side of the vehicle is not activated.

When the charger ECU 62 is activated by the battery ECU 42, the charger ECU 62 calculates, that is, determines, a calculated charge power which is power to be charged to the high-voltage battery 36 based on the SOC of the high-voltage battery 36 represented by the charge power determination signal which is transmitted from the charge power determination signal transmitting unit 72 (FIG. 4). Alternatively, when the charger ECU 62 determines the calculated charge power of the high-voltage battery 36, the charger ECU 62 may determine the calculated charge power based on the SOC of the high-voltage battery 36 and the temperature of the high-voltage battery 36. The charger ECU 62 also controls the AC/DC converter of the charger 60 such that the high-voltage battery 36 is charged from the external power supply 38 with the determined calculated charge power. The vehicle controller 20 (FIG. 1) controls the relay 34 such that the relay 34 (FIGS. 1-3) is switched OFF when the high-voltage battery 36 is charged from the external power supply 38 and the relay 34 is switched ON when the traveling motor 16 is driven. For example, the vehicle controller 20 connects the relay 34 when an activation switch (not shown) corresponding to the ignition switch is switched ON, that is, at the time of startup of the vehicle. In addition, as shown in FIG. 1, the battery ECU 42 and the high-voltage battery 36 are connected by the signal line 110, the battery ECU 42 and the charge-time connection switch 54 are connected by the signal line 112, the battery ECU 42 and the charger ECU are connected by the signal line 114, and the battery ECU 42 and the charging connector 50 are connected by the signal line 116.

In the hybrid electric vehicle 10 having such a structure, the external charging which is charging of the high-voltage battery 36 from the outside is controlled by a method of controlling charge described below with reference to a flowchart of FIG. 5. In the following description, elements identical to those shown in FIGS. 1-4 are described with the same reference numerals. As shown in the flowchart of FIG. 5, during external charging, first, when the charging connector 50 and the external power supply 38 are connected to each other in step S1, the CPLT is generated by the CPLT generator of the CCID 58 or the charging connector 50. Next, when the charging connector 50 is connected to the charge inlet 51 in step S2, the CPLT which is a voltage signal is output from the charging connector 50 through the charge inlet 51 and the signal line 116 to the battery ECU 42.

In addition, in step S2, when the CPLT which is output from the charging connector 50 is input to the battery ECU 42, the battery ECU 42 is activated. In step S3, the battery state judging unit 68 judges, after the battery ECU 42 is activated, whether or not the state of the high-voltage battery 36 satisfies all of the chargeable conditions based on the signal transmitted from the high-voltage battery 36 through the signal line 110. In step S4, when the battery state judging unit 68 judges that all of the chargeable conditions are satisfied, the switch connection charger ECU activating unit 70 transmits the connection instruction signal to the charge-time connection switch 54 through the signal line 112, to connect the charge-time connection switch 54, and transmits the activation instruction signal to the charger ECU 62 through the signal line 114, to activate the charger ECU 62.

In step S5, the charge power determination signal transmitting unit 72 transmits the charge power determination signal representing the SOC of the high-voltage battery 36 which is the battery state from the battery ECU 42 to the charger ECU 62 through the signal line 114. In step S6, the charger ECU 62 calculates the calculated charge power which is the charge power to be charged to the high-voltage battery 36 based on the SOC of the high-voltage battery 36 represented by the charge power determination signal, and, in step S7, the charger ECU 62 controls the charger 60 such that the high-voltage battery 36 is charged from the external power supply 38 with the calculated charge power which is calculated. In other words, when the high-voltage battery 36 is successfully charged with the calculated charge power, the charger ECU 62 cuts off the current which is input from the external power supply 38 to the side of the high-voltage battery 36 by the AC/DC converter of the charger 60.

With the hybrid electric vehicle and the method of controlling charging of the hybrid electric vehicle according to the present embodiment, in a hybrid electric vehicle comprising the battery 36 which can be charged from the external power supply 38, the charger 60, the charger ECU 62 which controls the charger 60, and the battery ECU 42 which monitors the state of the high-voltage battery 36, the energy loss during charging can be reduced and the charging efficiency can be improved. More specifically, according to the hybrid electric vehicle of the present embodiment, during the charging, the battery ECU 42 is activated when the CPLT which is a voltage signal is input from the charging connector 50 to the battery ECU 42, and when the battery state judging unit 68 judges that the state of the high-voltage battery 36 satisfies the chargeable condition, the switch connection charger controller activating unit 70 switches the charge-time connection switch 54 ON and the charger ECU 62 is activated. In addition, the charger ECU 62 controls the charger 60 such that the high-voltage battery 36 is charged from the external power supply 38 with the calculated charge power of the high-voltage battery 36 which is calculated based on the SOC which is transmitted from the charge power determination signal transmitting unit 72. Because of this, it is possible to prevent unnecessary activation of the charger ECU 62 during charging from the external power supply 38, reduce the energy loss during the charging, and improve the charging efficiency.

Moreover, according to the hybrid electric vehicle of the present embodiment, the relay 34 which is connected between the traveling motor 16 and the high-voltage battery 36 by the electric power line, and the vehicle controller 20 which switches the relay 34 OFF when the high-voltage battery 36 is charged from the external power supply 38 and which switches the relay 34 ON when the traveling motor 16 is driven are provided. Because of this, the charging from the external power supply 38 can be more efficiently executed. That is, during the charging from the external power supply 38, the battery ECU 42 is activated when the CPLT which is a voltage signal is input from the charging connector 50 to the battery ECU 42, and when the battery state judging unit 68 judges that the state of the high-voltage battery 36 satisfies the chargeable condition, the charger ECU 62 is activated, but in this process, the relay 34 connected between the traveling motor 16 and the high-voltage battery 36 is switched OFF. Because of this, the system for driving the traveling motor 16 such as the elements for driving the voltage boosting/reducing converter 24 and/or the inverters 26 and 28 and connected to the side nearer to the traveling motor 16 than the relay 34 does not need to be activated. Therefore, the power consumption during the charging can be reduced and the charging efficiency can be improved. During the traveling, on the other hand, because the relay 34 connected between the traveling motor 16 and the high-voltage battery 36 is switched ON, the power from the high-voltage battery 36 can be supplied to the side of the traveling motor 16, and traveling using the traveling motor 16 can be executed in the vehicle. In addition, for converting the voltage from the external power supply 38 during the charging from the external power supply 38, an AC/DC converter having a lower power capacity and which is not used during traveling may be used, and the voltage boosting/reducing converter 24 (FIG. 3) or the like which is used during the traveling does not need to be used. Because of this, the energy consumption during the charging can be reduced and the charging can be efficiently executed.

In addition, because the charge-time connection switch 54 comprises the system relays S1a and S1b and the semiconductor switching element M1 connected in series to the system relays S1a and S1b and having a current cut-off function, the current cut-off function does not need to be provided in the system relays S1a and S1b, and the size and loss of the system relays S1a and S1b can be reduced, and consequently the charging efficiency can be improved.

Second Embodiment

Figure 6:
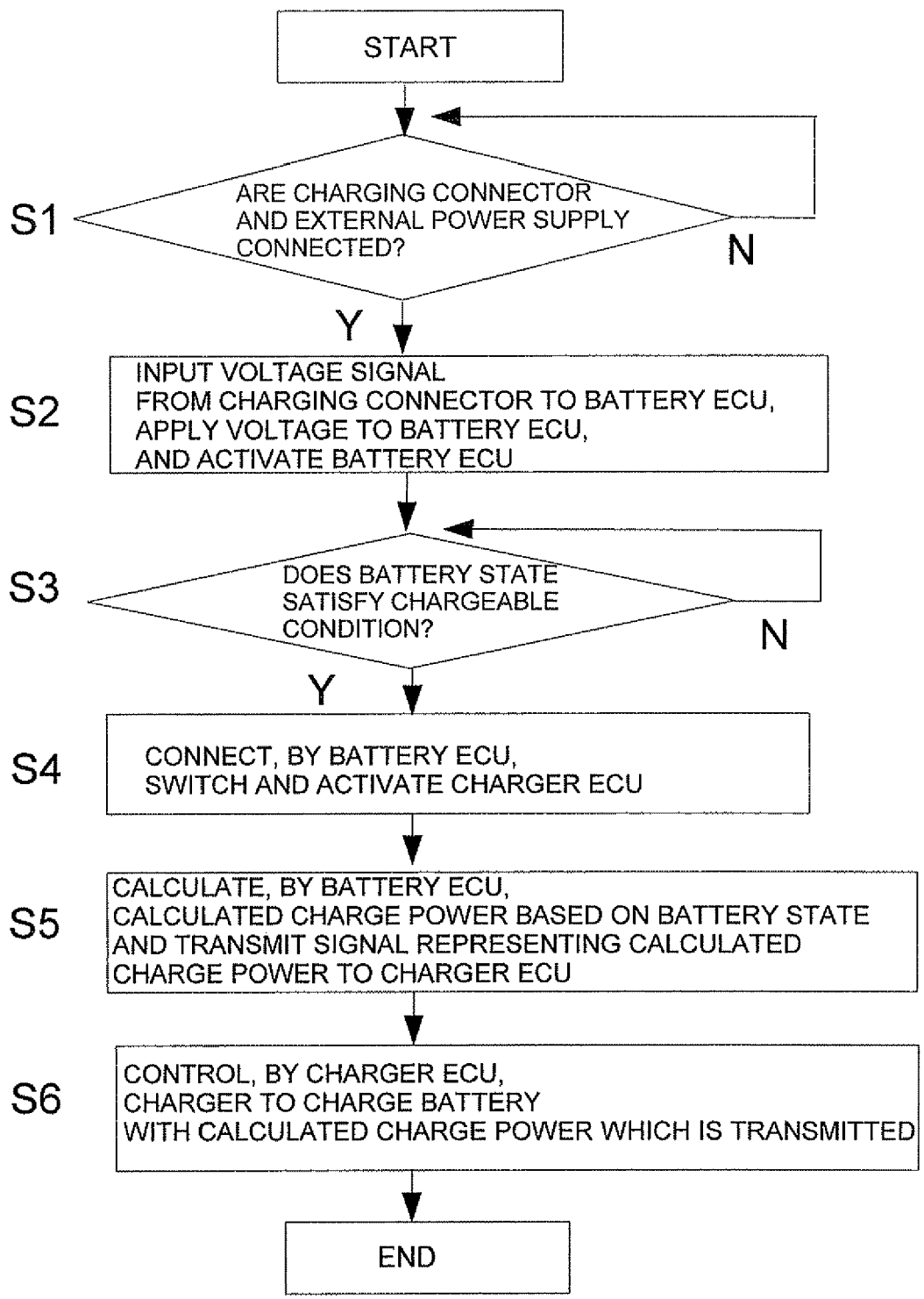
FIG. 6 is a flowchart for explaining a method of controlling charging of a hybrid electric vehicle according to a second embodiment of the present invention.

FIG. 6 is a flowchart for explaining a method of controlling charging of a hybrid electric vehicle according to a second embodiment of the present invention. In the first embodiment described above, as shown in FIG. 1, a configuration is described in which the battery ECU 42 transmits the signal representing the SOC of the high-voltage battery 36 which is the battery state to the charger ECU 62, and the charger ECU 62 calculates the calculated charge power of the high-voltage battery 36 based on the SOC of the high-voltage battery 36 and controls the charger 60 such that the high-voltage battery 36 is charged with the calculated charge power. In the following description, elements similar to those shown in FIGS. 1-4 will be described with the same reference numerals.

In the present embodiment, as shown in FIG. 6, when the switch connection charger ECU activating unit 70 of the battery ECU 42 activates the charger ECU 62 in step S4, the switch connection charger ECU activating unit 70 calculates the calculated charge power which is the charge power to be charged to the high-voltage battery 36 based on the SOC of the high-voltage battery 36 in step S5, and transmits a charge power determination signal representing the calculated charge power to the charger ECU 62.

In step S6, the charger ECU 62 controls the charger 60 such that the high-voltage battery 36 is charged with the calculated charge power represented by the charge power determination signal. In this manner, the calculation of the calculated charge power may be executed not by the charger ECU 62, but by the battery ECU 42. The other structures and operations are similar to those of the first embodiment described above, and will not be shown again in the drawing or described again. Alternatively, in the present embodiment, a configuration may be employed in which the battery ECU 42 calculates the calculated charge power after the battery ECU 42 judges that the high-voltage battery 36 satisfies the chargeable condition and before the battery ECU 42 activates the charger ECU 62.

Third Embodiment

Figure 7:
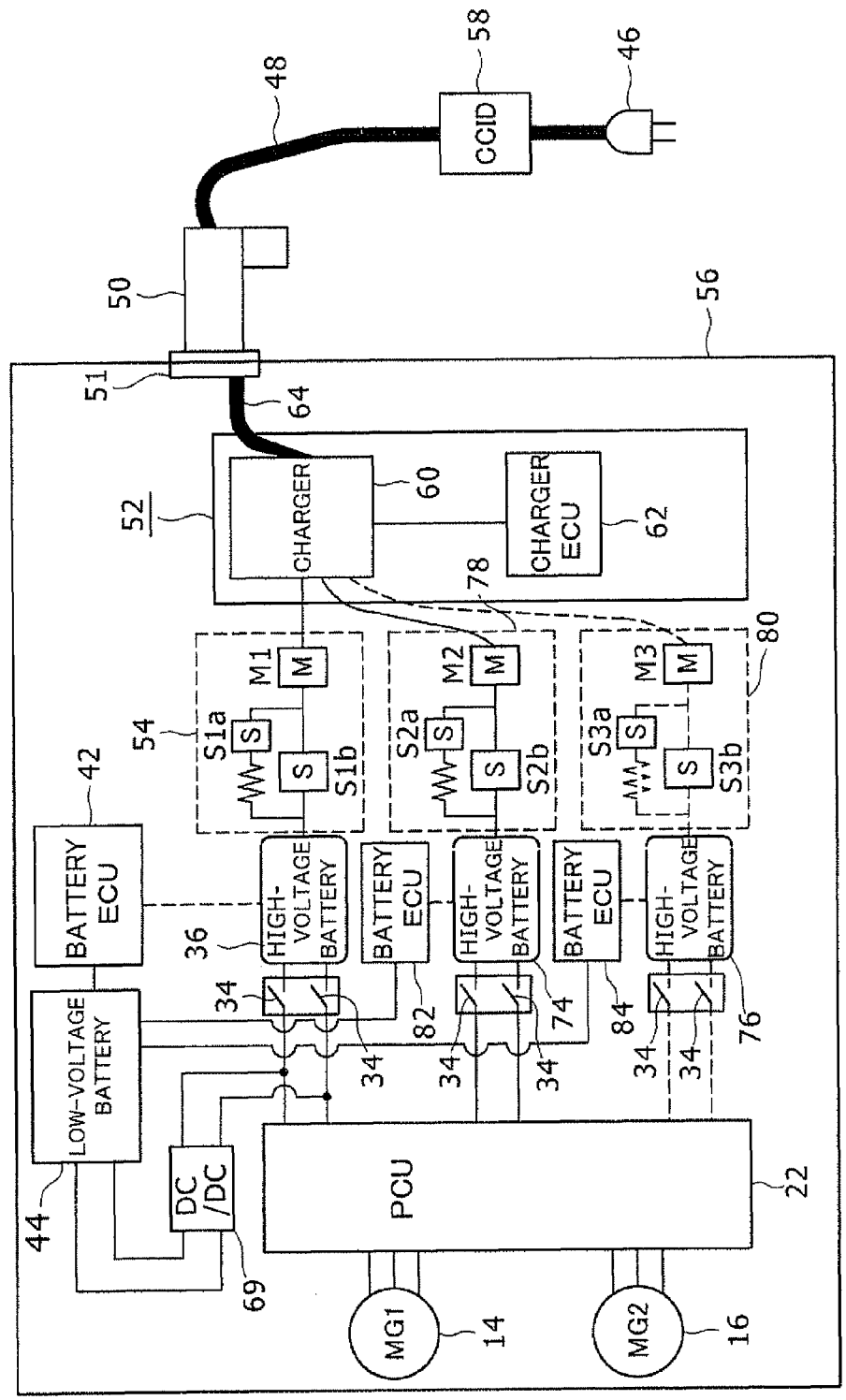
FIG. 7 is a diagram showing a circuit of a structure of a part of a hybrid electric vehicle in a third embodiment of the present invention.
Figure 8:
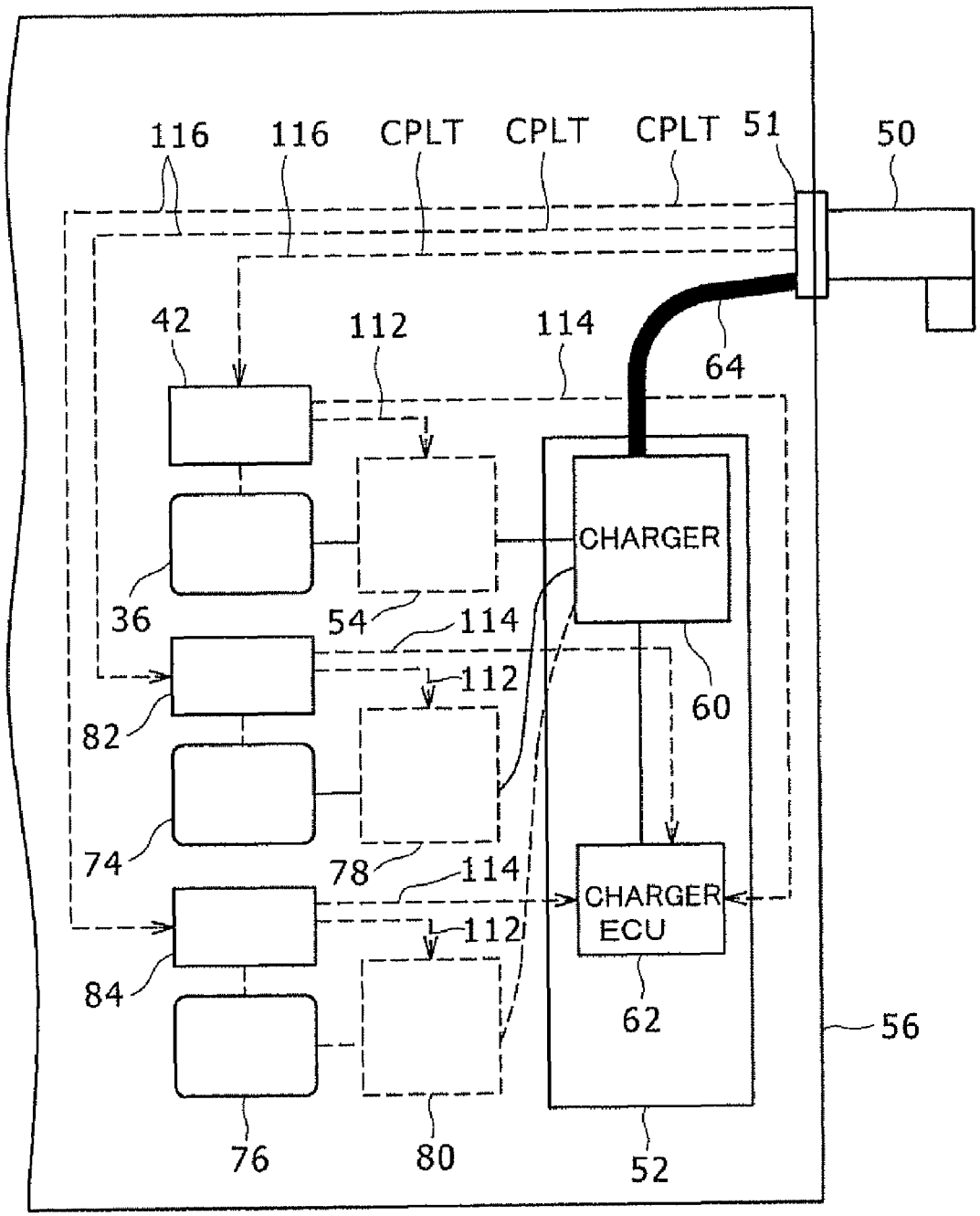
FIG. 8 is a diagram for explaining a signal transmission/reception path in a circuit of a part of FIG. 7.

FIG. 7 is a diagram showing a circuit of a structure of a part of a hybrid electric vehicle according to a third embodiment of the present invention. FIG. 8 is a diagram for explaining a signal transmission/reception path in the circuit of a part of FIG. 7.

The hybrid electric vehicle of the present embodiment is equipped with a plurality of high-voltage batteries 36, 74, and 76 as elements for driving the traveling motor 16 and the generator 14. Of the plurality of high-voltage batteries 36, 74, and 76, two high-voltage batteries 36 and 74 are batteries equipped in the hybrid electric vehicle by the side of the vehicle manufacturer as standard equipment, and the remaining high-voltage battery 76 is an optional battery which can be selected by the user to be equipped in the vehicle as an option. In the following description, a case will be described in which the hybrid electric vehicle is equipped with three high-voltage batteries 36, 74, and 76, but the present embodiment can be similarly applied for configurations where the vehicle is equipped with two high-voltage batteries or four or more high-voltage batteries.

During traveling of the vehicle, power can be supplied from the plurality of high-voltage batteries 36, 74, and 76 through the voltage boosting/reducing converter 24 to the traveling motor 16 or the generator 14, simultaneously or selectively, by the plurality of high-voltage batteries 36, 74, and 76. In addition, the hybrid electric vehicle of the present embodiment comprises a plurality of charge-time connection switches 54, 78, and 80 each connected between each of the high-voltage batteries 36, 74, and 76 and the charger 60, and a plurality of battery ECUs 42, 82, and 84 each of which is a battery controller which controls each of the high-voltage batteries 36, 74, and 76. Similar to the first embodiment described above, the charge-time connection switches comprise system relays S1a, S1b, S2a, S2b, S3a, and S3b, each charge-time connection switch having two system relays, and semiconductor switching elements M1, M2, and M3. Similar to the case of the above-described first embodiment shown in FIG. 4, each of the battery ECUs 42, 82, and 84 comprises the battery state judging unit 68, the switch connection charger ECU activating unit 70, and the charge power determination signal transmitting unit 72. The plurality of battery ECUs 42, 82, and 84 can be supplied with power by the low-voltage battery 44.

Each of the battery ECUs 42, 82, and 84 corresponds to each of the high-voltage batteries 36, 74, and 76, respectively, and communicates with the charger ECU 62. Each battery state judging unit 68 (refer to FIG. 4) judges whether or not the state of a corresponding one of the high-voltage batteries 36, 74, and 76 satisfies all of the chargeable conditions. In addition, with regard to the switch connection charger ECU activating units 70, after only the charge-time connection switches 54, 78, and/or 80 corresponding to the high-voltage batteries 36, 74, and 76 which are judged by the battery state judging unit 68 as satisfying all of the chargeable conditions, among the plurality of charge-time connection switches 54, 78, and 80, are connected, the switch connection charger ECU activating unit 70 of at least one battery ECU 42, 82, and 84 transmits an activation instruction signal to the charger ECU 62, to activate the charger ECU 62. The charger ECU 62 calculates the calculated charge power of each of the high-voltage batteries 36, 74, and 76 based on each of the SOCs of the high-voltage batteries 36, 74, and 76 representing the battery states represented by the signals transmitted from the battery ECUs 42, 82, and 84, and controls the charger 60 such that each of the high-voltage batteries 36, 74, and 76 is charged from the external power supply 38 with the calculated charge power.

In the method of controlling charging of the hybrid electric vehicle as described, similar to the above-described first embodiment shown in FIG. 5, the CPLT (refer to FIG. 2) which is a voltage signal is output to each of the plurality of battery ECUs 42, 82, and 84 from the charging connector 50.

When the CPLT is input from the charging connector 50 to each of the battery ECUs 42, 82, and 84 (refer to FIG. 4) of the battery ECUs 42, 82, and 84, each of the battery ECUs 42, 82, and 84 is activated. The battery state judging unit 68 judges, after the battery ECUs 42, 82, and 84 are activated, whether or not the state of the corresponding one of the high-voltage batteries 36, 74, and 76 satisfies all of the chargeable conditions, and when the battery state judging unit 68 judges that all of the chargeable conditions are satisfied, a corresponding one of the switch connection charger ECU activating units 70 transmits the connection instruction signal only to the charge-time connection switches 54, 78, and/or 80 corresponding to the high-voltage batteries 36, 74, and 76 which are judged as satisfying the chargeable condition, to connect the charge-time connection switches 54, 78, and/or 80, and then, at least one switch connection charger ECU activating unit 70 transmits the activation instruction signal to the charger ECU 62, to activate the charger ECU 62. In this case, the charger ECU 62 may have a structure in which the charger ECU 62 is activated by an activation instruction signal which is transmitted first from any of the battery ECUs 42, 82, and 84, and alternatively, may have a structure in which, when all of the plurality of switch connection charger ECU activating units 70 transmit the activation instruction signal, the charger ECU 62 is activated when the activation instruction signal which is first transmitted is received.

The charge power determination signal transmitting unit 72 (FIG. 4) of the battery ECUs 42, 82, and/or 84 corresponding to the high-voltage batteries 36, 74, and/or 76 judged as satisfying the chargeable condition transmits a signal representing the SOC of the high-voltage batteries 36, 74, and/or 76 representing the battery state from the battery ECUs 42, 82, and/or 84 to the charger ECU 62. The charger ECU 62 calculates the calculated charge power of the high-voltage batteries 36, 74, and/or 76 based on the SOC of the high-voltage batteries 36, 74, and/or 76, and controls the charger 60 such that the high-voltage batteries 36, 74, and/or 76 satisfying the chargeable condition are charged from the external power supply 38 with the calculated charge power.

According to the present embodiment, the plurality of battery ECUs 42, 82, and/or 84 correspond to the plurality of high-voltage batteries 36, 74, and/or 76, respectively, and communicate with the charger ECU 62, and the charge-time connection switches 54, 78, and 80 are connected between the high-voltage batteries 36, 74, and 76 and the charger 60, respectively. In addition, the charger ECU 62 calculates the calculated charge power of each of the high-voltage batteries 36, 74, and/or 76 based on the battery state represented by the charge power determination signal transmitted from the battery ECUs 42, 82, and/or 84 corresponding to the high-voltage batteries 36, 74, and/or 76 judged as satisfying the chargeable condition, and controls the charger 60 such that the high-voltage batteries 36, 74, and/or 76 satisfying the chargeable condition are charged from the external power supply 38 with the calculated charge power. Because of this, in a structure in which the plurality of high-voltage batteries 36, 74, and 76 can be simultaneously and efficiently used during traveling of the hybrid electric vehicle, efficient charging from the external power supply 38 can be enabled. Because the other structures and operations are similar to the above-described first embodiment shown in FIGS. 1-5, the similar portions are assigned the same reference numerals and will not be shown or described again.

In the present embodiment, a configuration may be employed where all of the battery ECUs 42, 82, and 84 do not monitor the battery state of the corresponding high-voltage batteries 36, 74, and 76, do not connect the charge-time connection switches 54, 78, and 80, do not activate the charger ECU 62, and do not transmit the signal representing the battery state to the charger ECU 62. In this case, for example, one battery ECU 42 of the plurality of battery ECUs 42, 82, and 84, may be connected to the remaining two battery ECUs 82 and 84 through a CAN bus network, so that the one battery ECU 42 integrally controls the remaining battery ECUs 82 and 84. In this case, the battery states of the high-voltage batteries 36, 74, and 76 during traveling are stored in the battery ECUs 42, 82, and 84 as a history, and the one battery ECU 42 reads the histories of the remaining two battery ECUs 82 and 84. The one battery ECU 42 selects the chargeable high-voltage batteries 36, 74, and/or 76 based on the history, connects the corresponding charge-time connection switches 54, 78, and/or 80 to the selected high-voltage batteries 36, 74, and/or 76, and activates the charger ECU 62. The one battery ECU 42, 82, and/or 84 transmits a signal representing the history of the battery states of the selected high-voltage batteries 36, 74, and/or 76 to the charger ECU 62, and the charger ECU 62 controls the charger 60 such that the selected high-voltage batteries 36, 74, and/or 76 are charged from the external power supply 38 with the determined charge power. In the case of such a configuration also, similar to the above-described embodiments, efficient charging from the external power supply 38 can be enabled.

Fourth Embodiment

Figure 9:
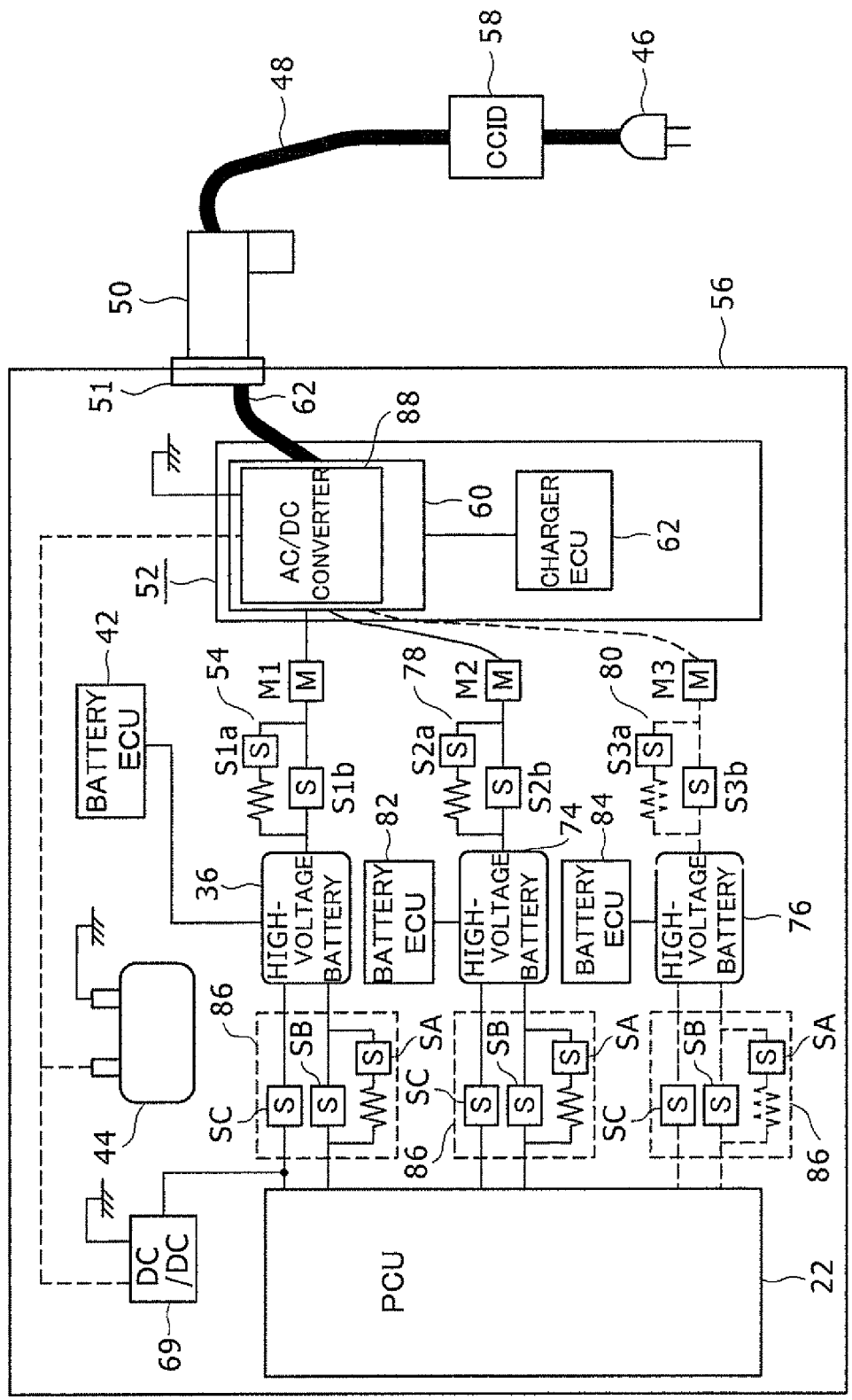
FIG. 9 is a diagram showing a circuit of a structure of a part of a hybrid electric vehicle according to a fourth preferred embodiment of the present invention.
Figure 10:
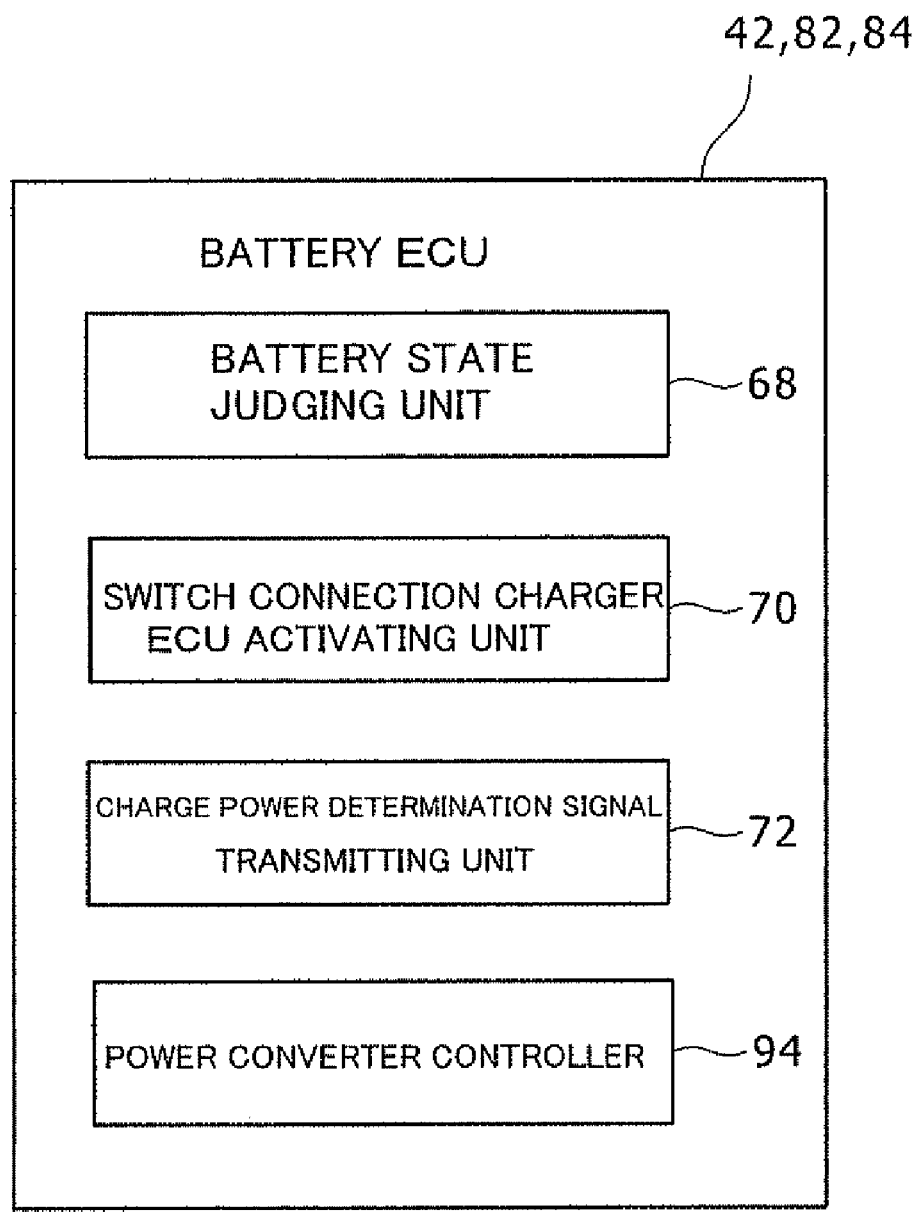
FIG. 10 is a block diagram showing a structure of each battery ECU in a fourth embodiment of the present invention.

FIG. 9 is a diagram showing a circuit of a structure of a part of a hybrid electric vehicle in a fourth embodiment of the present invention. FIG. 10 is a block diagram showing a structure of each battery ECU in the present embodiment.

In the present embodiment, in the above-described third embodiment shown in FIGS. 7 and 8, a travel-time connection switch 86, which is connected at the time of startup of the vehicle, that is, when an activation switch (not shown) corresponding to an ignition switch is switched ON, is connected between the voltage boosting/reducing converter 24 and the plurality of high-voltage batteries 36, 74, and 76. In the exemplified configuration, the travel-time connection switch 86 comprises system relays SA and SB connected between the positive electrode side or the negative electrode side of each of the high-voltage batteries 36, 74, and 76 and the power control unit 22, similar to the semiconductor switching elements S1$a$, S1$b$, S2$a$, S2$b$, S3$a$, and S3$b$ of the charge-time connection switches 54, 78, and 80 connected between the high-voltage batteries 36, 74, and 76 and the charger unit 52. In addition, a system relay SC is connected between the negative electrode side or the positive electrode side of each of the high-voltage batteries 36, 74, and 76 and the power control unit 22. Current capacities of the charge-time connection switches 54, 78, and 80 are set to be lower than a current capacity of the travel-time connection switch 86. The vehicle controller 20 (refer to FIG. 1) controls the travel-time connection switch 86 such that the travel-time connection switch 86 which is the relay is switched OFF when the high-voltage batteries 36, 74, and 76 are charged from the external power supply 38 (refer to FIG. 2) and the travel-time connection switch 86 is switched ON when the traveling motor 16 (refer to FIG. 1 or the like) is driven.

A DC/DC converter 69 is connected to the low-voltage battery 44 so that, during the traveling of the vehicle, the high voltage supplied from the generator 14 or the traveling motor 16 (refer to FIG. 1 or the like) through the inverters 26 and 28 (refer to FIG. 3) is reduced by the DC/DC converter 69 and is then supplied to the low-voltage battery 44, and the low-voltage battery 44 is charged. Moreover, an AC/DC converter 88 of the charger 60 is connected to the low-voltage battery 44 so that during the charging of the high-voltage batteries 36, 74, and 76 from the external power supply 38 (refer to FIG. 2), the voltage from the external power supply 38 is reduced by the AC/DC converter 88 and is then supplied to the low-voltage battery 44, and the low-voltage battery 44 is charged.

An output power capacity of the AC/DC converter 88 is set to be lower than an output power capacity of the voltage boosting/reducing converter 24 (refer to FIG. 3). In other words, for the switching element such as the transistor of the voltage boosting/reducing converter 24, a switching element is used that has a capability which can endure a usage in a case where a number of devices to be simultaneously connected to and supply power to the voltage boosting/reducing converter 24 is greater than the case of the AC/DC converter 88. On the other hand, for the AC/DC converter 88, a switching element is used in a case where a number of devices for supplying power is less than the voltage boosting/reducing converter 24, and that has a lower power capacity than the voltage boosting/reducing converter 24. The AC/DC converter 88 converts a high AC voltage such as 100 V which is supplied from the external power supply 38 into a low DC voltage such as 12 V, and supplies the converted voltage to the low-voltage battery 44. In other words, the hybrid electric vehicle of the present embodiment comprises the AC/DC converter 88 and the voltage boosting/reducing converter 24 which are two power converters for charging the low-voltage battery 44. In addition, the AC/DC converter 88 is equipped within the charger 60, and is activated only during the charging from the external power supply 38. On the other hand, the voltage boosting/reducing converter 24 is activated only during the traveling of the vehicle.

The vehicle controller 20 (refer to FIG. 1) comprises a travel-time connection switch controller (not shown) and a fusing detecting unit. In the following description, elements identical to those of FIG. 9 are described with the same reference numerals. When a signal representing that an activation switch (not shown) which can be operated by a driver is switched ON is input during the charging from the external power supply 38 (refer to FIG. 2), the travel-time connection switch controller connects the travel-time connection switch 86, that is switches the travel-time connection switch 86 ON, and when the signal representing that the activation switch is switched ON is not input during the charging from the external power supply 38, the travel-time connection switch controller does not connect the travel-time connection switch 86, that is, switches the travel-time connection switch 86 OFF.

The fusing detecting unit detects presence/absence of fusing of the system relays S1a, S1b, S2a, S2b, S3a, and S3b of the charge-time connection switch 78 when the charger 60 is activated. For example, the fusing detecting unit detects the presence/absence of fusing of corresponding charge-time connection switches 54, 78, and 80 by a current value detected when the connection instruction signal or the disconnection instruction signal is output to the corresponding charge-time connection switches 54, 78, and 80. Alternatively, in a case where each of the charge-time connection switches 54, 78, and 80 has two system relays among the system relays S1a, S1b, S2a, S2b, S3a, and S3b as in the present embodiment, the timing of the detection of the presence/absence of the fusing of the two system relays among the system relays S1a, S1b, S2a, S2b, S3a, and S3b by the fusing detecting unit 92 may be shifted. For example, after the presence/absence of fusing of the system relays S1a, S2a, and S3a to which a resistor is connected in series is detected, the presence/absence of the fusing of the system relays S1b, S2b, and S3b to which the resistor is not connected in series may be detected.

As shown in FIG. 10, the battery ECUs 42, 82, and 84 have a power converter controller 94. The power converter controller 94 drives the voltage boosting/reducing converter 24 (refer to FIG. 3) and stops driving of the AC/DC converter 88 when a signal representing that the activation switch which can be operated by the driver is switched ON during the charging from the external power supply 38 (refer to FIG. 2). Alternatively, a configuration may be employed in which the power converter controller 94 is not provided in the battery ECUs 42, 82, and 84, and is provided in another controller which controls the AC/DC converter 88 and the voltage boosting/reducing converter 24. In the configuration exemplified in the figures, the DC/DC converter 69 is connected to the electric power line to which the system relay SC is connected, among the electric power lines connecting the high-voltage battery 36 and the power control unit 22, but alternatively, the DC/DC converter 69 may be connected to the side of the electric power lines to which the system relay SB and the system relay SC are connected.

With the hybrid electric vehicle of the present embodiment also, in a hybrid electric vehicle having the batteries 36, 74, and 76 which can be charged from the external power supply 38, the charger 60, the charger ECU 62 which controls the charger 60, and the battery ECU 42 which monitors the state of the high-voltage battery 36, the energy loss during charging can be reduced and the charging efficiency can be improved. In addition, even in the configuration in which the voltage boosting/reducing converter 24 is provided between the high-voltage batteries 36, 74, and 76 and the traveling motor 16, the high-voltage batteries 36, 74, and 76 can be charged from the external power supply 38 without passing through the voltage boosting/reducing converter 24, and a hybrid electric vehicle can be realized in which the charging from the external power supply 38 can be efficiently executed. In addition, the travel-time connection switch controller is provided which switches the travel-time connection switch 86 ON when a signal representing that the activation switch which can be operated by the driver is switched ON is input during the charging from the external power supply 38, and which does not switch the travel-time connection switch 86 ON when the signal representing that the activation switch is switched ON is not input during the charging from the external power supply 38. Because of this, it is possible to inhibit application of a high voltage during the charging to the vehicle-equipped devices such as the electrically-driven power steering device which is driven during the traveling. In addition, when it is necessary to supply a high-voltage power to the vehicle-equipped device such as in a case of running of the vehicle-equipped device such as an air conditioning device equipped in the vehicle, the travel-time connection switch 86 can be switched ON by the switching ON of the activation switch, and power of the high-voltage batteries 36, 74, and 76 may be supplied to the vehicle-equipped device. However, in this case also, control is applied such that traveling is prohibited when the vehicle is parked. For example, the motor controller 18 (refer to FIG. 1) applies control such that the gate signal is not sent to the inverter 28 for traveling motor (refer to FIG. 3) when the shift lever is at a P-range position. Because the other structures and operations are similar to those of the above-described third embodiment shown in FIGS. 7 and 8, similar elements are assigned similar reference numerals and will not be shown in the figures again and will not be described again.

Moreover, a configuration may be employed for an electrically-driven vehicle equipped with a vehicle-equipped charger, wherein two power converters such as a DC-DC converter for charging the low-voltage battery such as 12 V are provided, one of the two power converters is equipped within the charger and is only activated during the charging from the external power supply, the other power converter of the two power converters is activated only during the traveling of the vehicle, an output capacity of the one power converter is set to be lower than an output capacity of the other power converter, and a power converter controller is provided which drives the other power converter and stops the driving of the one power converter when a signal representing that the activation switch which can be operated by the driver is switched ON is input during the charging from the external power supply.

Figure 11:
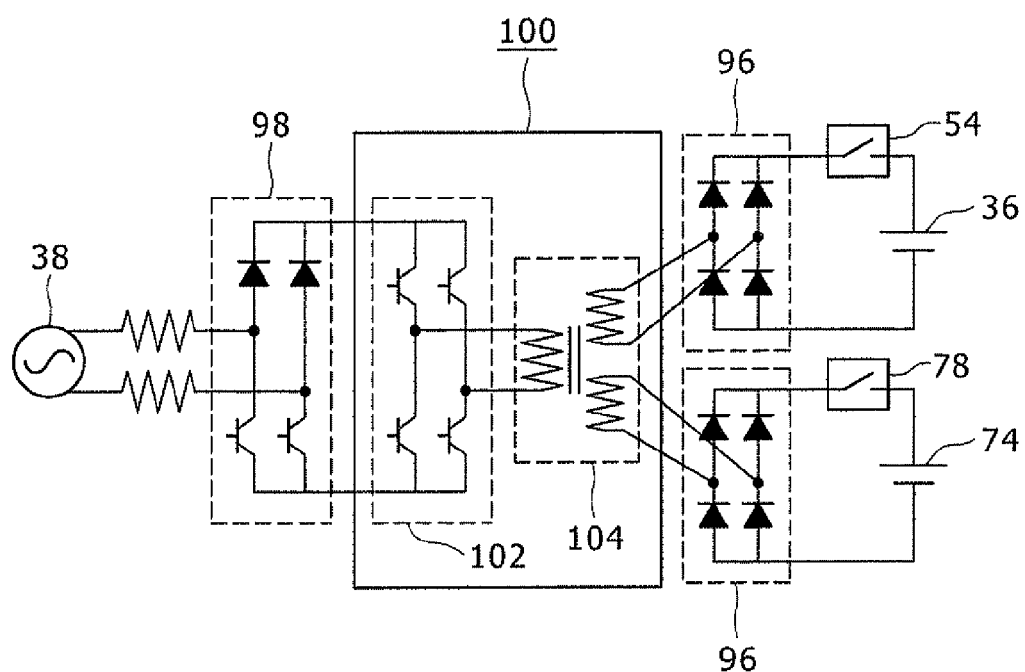
FIG. 11 is an outline circuit diagram showing a structure which externally charges a plurality of high-voltage batteries in a hybrid electric vehicle which is an electrically-driven vehicle according to the present invention.

FIG. 11 is an outline circuit diagram showing a structure for externally charging a plurality of high-voltage batteries in a hybrid electric vehicle which is an electrically-driven vehicle related to the present invention. The hybrid electric vehicle shown in FIG. 11 comprises a plurality of (in the exemplified configuration, two) high-voltage batteries 36 and 74 equipped in the vehicle and which are to be charged from the external power supply 38, first rectifier circuit units 96 connected to each of the high-voltage batteries 36 and 74, a second rectifier circuit unit 98 connected to the external power supply 38, and a charger 100. The charger 100 comprises a switching circuit unit 102 connected to the second rectifier circuit unit 98 and a voltage converter 104 provided between the switching circuit unit 102 and each first rectifier circuit unit 96. The switching circuit unit 102 is formed, for example, with semiconductor switching elements such as a MOS-FET. Charge-time connection switches 54 and 78 which are relays are provided between the second rectifier circuit unit 98 and the high-voltage batteries 36 and 74, which is also between the first rectifier circuit unit 96 and the high-voltage batteries 36 and 74. Similar to the above-described embodiments, when the charging connector (not shown) and the external power supply 38 are connected and the charging connector is connected to the charge inlet (not shown), a voltage signal is transmitted from the charging connector through the charge inlet to the battery ECU (not shown), and the battery ECU is activated.

When the high-voltage batteries 36 and 74 are to be charged from the external power supply 38, a voltage which is converted from an AC voltage to a DC voltage and boosted by the second rectifier circuit unit 98 and the charger 100 is supplied to each of the high-voltage batteries 36 and 74, and each of the high-voltage batteries 36 and 74 is charged. In addition, in the exemplified configuration of FIG. 11, the charger 100 and the plurality of high-voltage batteries 36 and 74 are connected to each other through output cables. Moreover, a configuration is employed in which, during the charging of the high-voltage batteries 36 and 74 from the external power supply 38, power is supplied from the external power supply 38 to the high-voltage battery 36 (or 74) having the lowest voltage among the plurality of high-voltage batteries 36 and 74, by natural consequences of charging.

With the hybrid electric vehicle 10 shown in FIG. 11, in the charger 100, by only controlling the ON and OFF of the charging, it is possible to facilitate supply of the charge power to the high-voltage batteries 36 and 74 having insufficient charged power. Specifically, the charger 100 comprises the charger ECU 62 (refer to FIG. 2 or the like) which is a charger controller, the charger ECU 62 or the battery ECU (not shown) which is the battery controller monitors the SOC which is the battery state of each of the high-voltage batteries 36 and 74, and the ON and OFF states for the charging are controlled such that the semiconductor switching element of the switching circuit unit 102 is switched OFF when the SOC is greater than or equal to a predetermined value which is set in advance, so that the charge power can be more easily supplied to the high-voltage batteries 36 and 74 having insufficient charged power. In other words, in the exemplified configuration of FIG. 11, when the high-voltage batteries 36 and 74 are charged from the external power supply 38, the distribution of the charge power is implicitly executed for the plurality of high-voltage batteries 36 and 74 and is not explicitly executed. Because of this, in the charger ECU 62 of the charger 100, it becomes no longer necessary to control the charger 100 to determine the charge power of the high-voltage batteries 36 and 74 based on the battery state and to charge the high-voltage batteries 36 and 74 from the external power supply 38 with the determined charge power. The other structures and operations are similar to those of the above-described first embodiment shown in FIGS. 1-5, and will not be described again and will not be shown again. In the configuration exemplified in the figures, the charger 100 does not have the second rectifier circuit unit 98, but alternatively, the charger 100 may include the second rectifier circuit unit 98.

[Explanation of Reference Numerals]

10 HYBRID ELECTRIC VEHICLE; 12 ENGINE; 14 GENERATOR (MG1); 16 TRAVELING MOTOR (MG2); 18 MOTOR CONTROLLER; 20 VEHICLE CONTROLLER; 22 POWER CONTROL UNIT (PCU); 24 VOLTAGE BOOSTING/REDUCING CONVERTER; 26 GENERATOR INVERTER (MG1 INVERTER); 28 TRAVELING MOTOR INVERTER (MG2 INVERTER); 30 FIRST CAPACITOR; 32 SECOND CAPACITOR; 34 RELAY; 36 HIGH-VOLTAGE BATTERY; 38 EXTERNAL POWER SUPPLY; 40 CHARGING CIRCUIT; 42 BATTERY ECU; 44 LOW-VOLTAGE BATTERY; 46 PLUG; 48 HIGH-VOLTAGE-RELATED CABLE; 50 CHARGING CONNECTOR; 51 CHARGE INLET; 52 CHARGER UNIT; 54 CHARGE-TIME CONNECTION SWITCH; 56 VEHICLE BODY; 58 CCID; 60 CHARGER; 62 CHARGER ECU; 64 HIGH-VOLTAGE-RELATED CABLE; 68 BATTERY STATE JUDGING UNIT; 69 DC/DC CONVERTER; 70 SWITCH CONNECTION CHARGER ECU ACTIVATING UNIT; 72 CHARGE POWER DETERMINATION SIGNAL TRANSMITTING UNIT; 74, 76 HIGH-VOLTAGE BATTERY; 78, 80 CHARGE-TIME CONNECTION SWITCH; 82, 84 BATTERY ECU; 86 TRAVEL-TIME CONNECTION SWITCH; 88 AC/DC CONVERTER; 92 FUSING DETECTING UNIT; 94 POWER CONVERTER CONTROLLER; 96 FIRST RECTIFIER CIRCUIT UNIT; 98 SECOND RECTIFIER CIRCUIT UNIT; 100 CHARGER; 102 SWITCHING CIRCUIT UNIT; 104 VOLTAGE CONVERTER; 106 ELECTRIC POWER LINE; 108, 110, 112, 114, 116 SIGNAL LINE

The invention claimed is:

1. An electrically-driven vehicle comprising:
   a charging circuit having a battery which can be charged from an external power supply, which supplies power to a traveling motor during traveling of the vehicle, and which is disconnected from the traveling motor during charging from the external power supply, a charger which is connected to the battery by an electric power line, and a switch which is connected between the charger and the battery by an electric power line;
   a charger controller which controls the charger; and
   a battery controller which monitors a battery state, wherein the battery controller is a battery controller which is activated when a voltage signal is input to the battery controller, and comprises:
   a battery state judging unit which judges, after the battery controller is activated, whether or not the battery state satisfies a chargeable condition; and an activating unit which switches a switch which is connected to the battery controller by a signal line ON when the battery state judging unit judges that the battery state satisfies the chargeable condition, to activate the charger controller which is connected to the battery controller by a signal line, and the charger controller controls the charger such that the battery is charged from the external power supply.

2. An electrically-driven vehicle comprising:

a charging circuit having a battery which can be charged from an external power supply, a charger which is connected to the battery by an electric power line, and a switch which is connected between the charger and the battery by an electric power line;

a charger controller which controls the charger;

a battery controller which monitors a battery state;

a traveling motor which is driven by supply of power from the battery;

a relay which is connected between the traveling motor and the battery by an electric power line; and a vehicle controller which switches the relay OFF when the battery is charged from the external power supply and which switches the relay ON when the traveling motor is driven, wherein the battery controller is a battery controller which is activated when a voltage signal is input to the battery controller, and comprises:

a battery state judging unit which judges, after the battery controller is activated, whether or not the battery state satisfies a chargeable condition;

an activating unit which switches a switch which is connected to the battery controller by a signal line ON when the battery state judging unit judges that the battery state satisfies the chargeable condition, to activate the charger controller which is connected to the battery controller by a signal line; and a charge power determination signal transmitting unit which transmits, to the charger controller, a charge power determination signal representing the battery state or a calculated charge power to be charged to the battery which is calculated based on the battery state, and the charger controller controls the charger such that the battery is charged from the external power supply with a calculated charge power to be charged to the battery calculated based on the battery state represented by the charge power determination signal or the calculated charge power represented by the charge power determination signal.

3. The electrically-driven vehicle according to claim 1, wherein a plurality of batteries are employed as the battery, a plurality of battery controllers each corresponding to each battery and communicating with the charger controller are employed as the battery controller, a plurality of switches each connected between each battery and the charger by an electric power line are employed as the switch, and the charger controller controls the charger such that each battery is charged from the external power supply with a calculated charge power of the battery calculated based on the battery state transmitted from each battery controller or the calculated charge power transmitted from the battery controller.

4. The electrically-driven vehicle according to claim 3, wherein each of the plurality of battery controllers judges whether or not the battery state of a corresponding battery satisfies the chargeable condition, and at least one battery controller transmits an activation instruction signal to the charger controller after only a switch, among the plurality of switches, corresponding to a battery judged as satisfying the chargeable condition is switched ON.

5. A method of controlling charging of an electrically-driven vehicle comprising:

a charging circuit having a battery which can be charged from an external power supply, which supplies power to a traveling motor during traveling of the vehicle, and which is disconnected from the traveling motor during charging from the external power supply, a charger which is connected to the battery by an electric power line, and a switch which is connected between the charger and the battery by an electric power line;

a charger controller which controls the charger; and a battery controller which monitors a battery state, the method comprising the steps of:

activating the battery controller when a voltage signal is input to the battery controller;

judging, by the battery controller, after the battery controller has been activated, whether or not the battery state satisfies a chargeable condition;

switching a switch which is connected to the battery controller by a signal line ON when the battery controller judges that the battery state satisfies the chargeable condition, to activate the charger controller which is connected to the battery controller by a signal line; and controlling, by the charger controller, the charger such that the battery is charged from the external power supply.

6. A method of controlling charging of an electrically-driven vehicle comprising:

a charging circuit having a battery which can be charged from an external power supply, a charger which is connected to the battery by an electric power line, and a switch which is connected between the charger and the battery by an electric power line;

a charger controller which controls the charger;

a battery controller which monitors a battery state;

a relay which is connected between a traveling motor and the battery by an electric power line; and a vehicle controller which switches the relay OFF when the battery is charged from the external power supply and which switches the relay ON when the traveling motor is driven, the method comprising the steps of:

activating the battery controller when a voltage signal is input to the battery controller;

judging, by the battery controller, after the battery controller has been activated, whether or not the battery state satisfies a chargeable condition;

switching a switch which is connected to the battery controller by a signal line ON when the battery controller judges that the battery state satisfies the chargeable condition, to activate the charger controller which is connected to the battery controller by a signal line;

transmitting, by the battery controller, to the charger controller, a charge power determination signal representing the battery state or a calculated charge power to be charged to the battery which is calculated based on the battery state; and controlling, by the charger controller, the charger such that the battery is charged from the external power supply with a calculated charge power to be charged to the battery calculated based on the battery state represented by the charge power determination signal or the calculated charge power represented by the charge power determination signal.

7. The method of controlling charging of the electrically-driven vehicle according to claim 5, wherein
a plurality of batteries are employed as the battery,
a plurality of battery controllers each corresponding to each battery and communicating with the charger controller are employed as the battery controller,
a plurality of switches each connected between each battery and the charger by an electric power line are employed as the switch, and
the method further comprises the step of controlling, by the charger controller, the charger such that each battery is charged from the external power supply with a calculated charge power of the battery calculated based on the battery state transmitted from each battery controller or the calculated charge power transmitted from the battery controller.

8. The method of controlling charging of the electrically-driven vehicle according to claim 7, further comprising the step of:
judging, by each of the plurality of battery controllers, whether or not the battery state of a corresponding battery satisfies the chargeable condition, and transmitting, by at least one battery controller, an activation instruction signal to the charger controller after only a switch, among the plurality of switches, corresponding to a battery judged as satisfying the chargeable condition is switched ON.

9. The electrically-driven vehicle according to claim 2, wherein
a plurality of batteries are employed as the battery,
a plurality of battery controllers each corresponding to each battery and communicating with the charger controller are employed as the battery controller,
a plurality of switches each connected between each battery and the charger by an electric power line are employed as the switch, and
the charger controller controls the charger such that each battery is charged from the external power supply with a calculated charge power of the battery calculated based on the battery state transmitted from each battery controller or the calculated charge power transmitted from the battery controller.

10. The electrically-driven vehicle according to claim 9, wherein
each of the plurality of battery controllers judges whether or not the battery state of a corresponding battery satisfies the chargeable condition, and at least one battery controller transmits an activation instruction signal to the charger controller after only a switch, among the plurality of switches, corresponding to a battery judged as satisfying the chargeable condition is switched ON.

11. The method of controlling charging of the electrically-driven vehicle according to claim 6, wherein
a plurality of batteries are employed as the battery,
a plurality of battery controllers each corresponding to each battery and communicating with the charger controller are employed as the battery controller,
a plurality of switches each connected between each battery and the charger by an electric power line are employed as the switch, and
the method further comprises the step of controlling, by the charger controller, the charger such that each battery is charged from the external power supply with a calculated charge power of the battery calculated based on the battery state transmitted from each battery controller or the calculated charge power transmitted from the battery controller.

12. The method of controlling charging of the electrically-driven vehicle according to claim 11, further comprising the step of
judging, by each of the plurality of battery controllers, whether or not the battery state of a corresponding battery satisfies the chargeable condition, and transmitting, by at least one battery controller, an activation instruction signal to the charger controller after only a switch, among the plurality of switches, corresponding to a battery judged as satisfying the chargeable condition is switched ON.

* * * * *